US010446995B2

(12) United States Patent
Lewis et al.

(10) Patent No.: US 10,446,995 B2
(45) Date of Patent: Oct. 15, 2019

(54) SUPERCONDUCTING DEVICES, SUCH AS SLIP-RINGS AND HOMOPOLAR MOTORS/GENERATORS

(71) Applicant: Moog Inc., East Aurora, NY (US)

(72) Inventors: Norris E. Lewis, Christiansburg, VA (US); Barry K. Witherspoon, Blacksburg, VA (US)

(73) Assignee: Moog Inc., East Aurora, NY (US)

( * ) Notice: Subject to any disclaimer, the term of this patent is extended or adjusted under 35 U.S.C. 154(b) by 388 days.

(21) Appl. No.: 15/500,423

(22) PCT Filed: Oct. 17, 2014

(86) PCT No.: PCT/US2014/061111
§ 371 (c)(1),
(2) Date: Jan. 30, 2017

(87) PCT Pub. No.: WO2016/060682
PCT Pub. Date: Apr. 21, 2016

(65) Prior Publication Data
US 2017/0250512 A1 Aug. 31, 2017

(51) Int. Cl.
H02K 31/00 (2006.01)
H01R 39/24 (2006.01)
(Continued)

(52) U.S. Cl.
CPC ........... H01R 39/24 (2013.01); H01R 39/025 (2013.01); H01R 39/381 (2013.01); H01R 39/46 (2013.01); H02K 9/28 (2013.01); H02K 55/06 (2013.01)

(58) Field of Classification Search
CPC .... H01R 39/24; H01R 39/025; H01R 39/045; H01R 39/46; H01R 39/381; H02K 9/28; H02K 55/06
See application file for complete search history.

(56) References Cited

U.S. PATENT DOCUMENTS 4,349,760 A * 9/1982 Diepers .................. H01R 39/24
310/248
4,398,113 A 8/1983 Lewis et al.
(Continued)

FOREIGN PATENT DOCUMENTS

CN 101124684 A 2/2008
CN 201533223 U 7/2010
(Continued)

OTHER PUBLICATIONS

International Search Report and Written Opinion of the International Searching Authority (14 pages) completed Jun. 4, 2015.
(Continued)

Primary Examiner — Thanh Lam
(74) Attorney, Agent, or Firm — Harter Secrest & Emery LLP

(57) ABSTRACT

A device (i.e., a slip-ring or a homopolar motor/generator) (40, 50, 80) is adapted to provide electrical contact between a stator and a rotor (41, 83), and includes: a current-carrying brush-spring (31, 84) mounted on the stator, and having two opposite surfaces; a fibrous brush assembly (35, 69) mounted on the conductor, the brush assembly having a bundle of fibers (36, 71) arranged such that the tips of the fibers will engage the rotor for transferring electrical current between the stator and rotor; a ribbon (33, 85) of superconducting material mounted on each opposite surface of the current-carrying brush-spring and communicating with the stator and the brush assembly; and another ribbon (29, 86) of superconducting material mounted on the rotor. The device is submerged in a cryogenic fluid at a temperature below the transition temperatures of the superconducting materials such that the electrical resistivity of the device will be reduced and the current-transfer capability of the device will be increased.

16 Claims, 12 Drawing Sheets

(51) Int. Cl.
*H01R 39/38* (2006.01)
*H01R 39/46* (2006.01)
*H01R 39/02* (2006.01)
*H02K 9/28* (2006.01)
*H02K 55/06* (2006.01)

(56) References Cited

U.S. PATENT DOCUMENTS

| | | | |
|---|---|---|---|
| 4,602,177 A * | 7/1986 | Eckels | H02K 9/20 |
| | | | 165/288 |
| 4,938,282 A | 7/1990 | Zohler | |
| 5,375,654 A | 12/1994 | Hougland et al. | |
| 5,408,152 A | 4/1995 | Finnerty et al. | |
| 5,415,225 A | 5/1995 | Randlett et al. | |
| 5,555,622 A | 9/1996 | Yamamoto et al. | |
| 5,791,405 A | 8/1998 | Takiura et al. | |
| 5,862,857 A | 1/1999 | Ishikawa et al. | |
| 5,934,128 A | 8/1999 | Takiura et al. | |
| 6,006,826 A | 12/1999 | Goddard et al. | |
| 6,173,763 B1 | 1/2001 | Sano et al. | |
| 6,222,331 B1 | 4/2001 | Blum | |
| 6,245,440 B1 | 6/2001 | Kuhlmann-Wilsdorf et al. | |
| 6,800,981 B2 * | 10/2004 | Kuhlmann-Wilsdorf | H01R 39/381 |
| | | | 310/239 |
| 6,903,484 B1 * | 6/2005 | Kuhlmann-Wilsdorf | H01R 39/381 |
| | | | 310/239 |
| 7,105,983 B2 | 9/2006 | Day et al. | |
| 7,339,302 B2 | 3/2008 | Lewis et al. | |
| 7,423,359 B2 | 9/2008 | Lewis et al. | |
| 7,463,914 B2 | 12/2008 | Blum | |
| 7,495,366 B2 | 2/2009 | Day et al. | |
| 7,545,073 B2 | 6/2009 | Lewis et al. | |
| 7,557,485 B1 * | 7/2009 | Lynch | H01R 39/18 |
| | | | 310/219 |
| 7,915,770 B2 | 3/2011 | Lee et al. | |
| 8,078,242 B2 | 12/2011 | Blum | |
| 8,091,616 B2 | 1/2012 | Lu et al. | |
| 2003/0052564 A1 | 3/2003 | Wilsdorf | |
| 2003/0094880 A1 * | 5/2003 | Hsu | H02K 21/38 |
| | | | 310/266 |
| 2005/0073206 A1 | 4/2005 | Wilsdorf | |
| 2005/0280329 A1 | 12/2005 | Day et al. | |
| 2006/0186371 A1 | 8/2006 | Selvamanickam et al. | |
| 2006/0186381 A1 | 8/2006 | Selvamanickam et al. | |
| 2008/0048513 A1 | 2/2008 | Wilsdorf | |
| 2008/0278025 A1 | 11/2008 | Norris et al. | |
| 2013/0225415 A1 | 8/2013 | Kim et al. | |
| 2014/0045348 A1 | 2/2014 | Norris et al. | |
| 2014/0306568 A1 | 10/2014 | Guina et al. | |

FOREIGN PATENT DOCUMENTS

| | | |
|---|---|---|
| CN | 104332795 A | 2/2015 |
| DE | 102006058259 A1 | 6/2008 |
| EP | 0054380 A2 | 6/1982 |
| JP | S57113570 A | 7/1982 |
| JP | S6110084 U | 1/1986 |
| JP | S6450745 A | 2/1989 |
| JP | H0874862 A | 3/1996 |
| JP | H1050745 A | 2/1998 |
| JP | 2000513558 A | 10/2000 |
| JP | 2008043194 A | 2/2008 |
| JP | 2013084382 A | 5/2013 |
| JP | 2014513913 A | 6/2014 |
| KR | 20070093702 A | 9/2007 |
| WO | 2013137843 A1 | 9/2013 |

OTHER PUBLICATIONS

McNab: "Advances in Electrical Current Collection"—Sep. 23-25, 1981 (pp. 69-79) Elsevier Sequoia S.A., Lausanne and New York© 1982.

Kalsi: "Applications of High Temperature Superconductors to Electric Power Equipment" (pp. 129-138) © 2011 by Institute of Electrical and electronics Engineers.

Patel: "Shipboard Propulsion, Power Electronics, and Ocean Energy" (pp. 219-220) © 2012 by Taylor & Francis Group, LLC CRC Press.

Sheahen: "Introduction to high-Temperature Superconductivity" (5 pages) Plenum Press© 1994.

Superczynski, Jr. et al: Homopolar Motor with High Temperature Superconductor Field Windings IEEE Transactions on Applied Superconductivity, Vo. 7, No. 2, Jun. 1997 (pp. 513-518).

Lewis et al.: "Lubrication Quantity: Observation of the Effects on Gold Sliding Contact Wear Character and In Situ Contamination Formation" IEEE Transactions on Components, Hybrids, and Manufacturing Technology, vol. CHMT-2, No. 1, Mar. 1979 (6 pages).

Wikipedia: High-temparature superconductivity (3 pages) http://en.wikipedia.org/wiki/High-temperature_superconductivity Nov. 26, 2013.

Wikipedia: Electromagnetic induction (13 pages) en.wikipedia.org/wiki/Faraday%27s_law_of_induction#Faraday.27s_law Oct. 16, 2013.

Website: Doosan Heavy Industries & Construction Business Sector http://www.doosan.com/doosanheavybiz/en/services/green_energy/superconducting.page?WT.ac+MainMenu1 [Feb. 24, 2014] 2 pages.

Website: SuperPower, Inc. http://www.superpower-inc.com./content/2g-hts-wire [May 16, 2014] 2 pages.

Wikipedia: Liquid dielectric http://en.wikipedia.org/wiki/Liquid dielectric [Feb. 21, 2014] 3 pages.

* cited by examiner

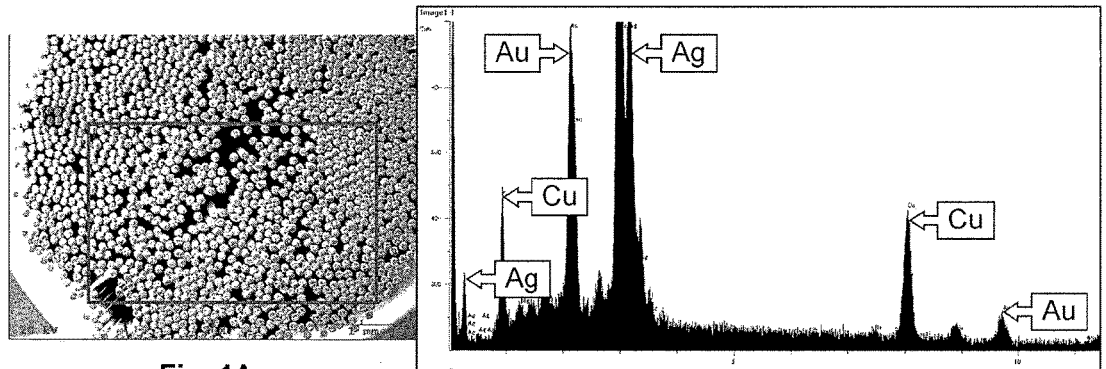
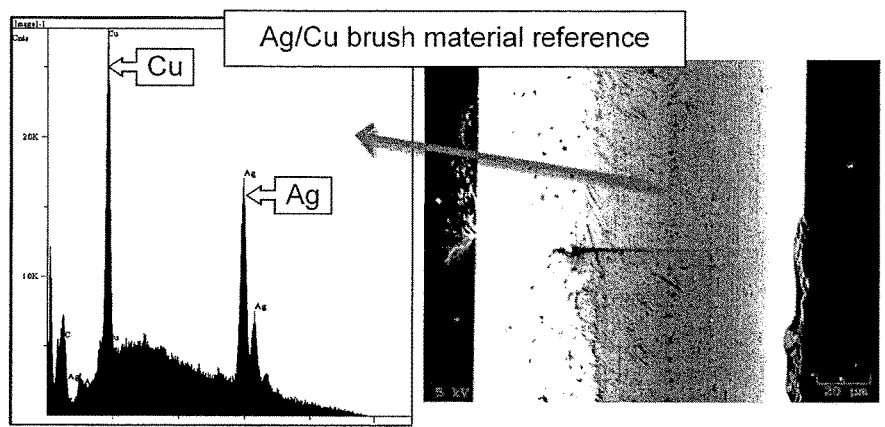
Fig. 1. SEM/EDAX analysis of an Ag/Cu FOT brush that has undergone small oscillations on a superconducting slip-ring with an electrodeposited Au rotor ring while submerged in liquid nitrogen. The Au shown in the analysis confirms Au that has been transferred from the slip-ring to the tips of each of the fibers.

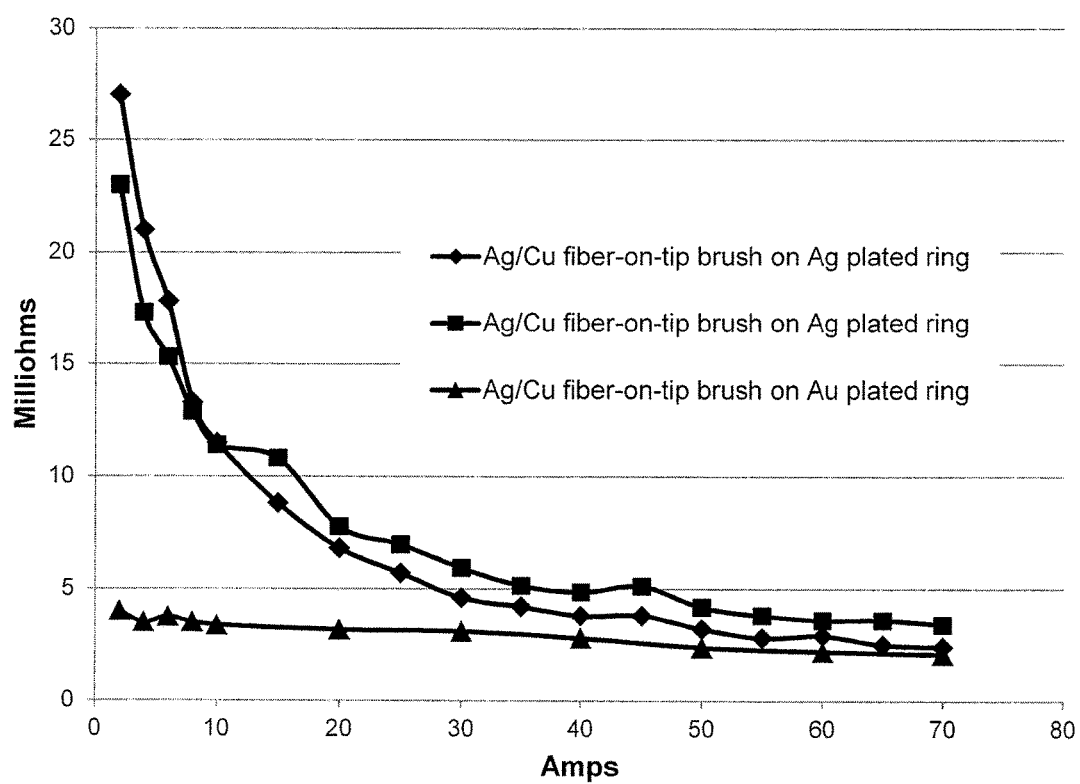
Fig. 2. Static contact resistance vs. current (FOT static measurements made with superconducting brush spring and ring submerged in liquid nitrogen).

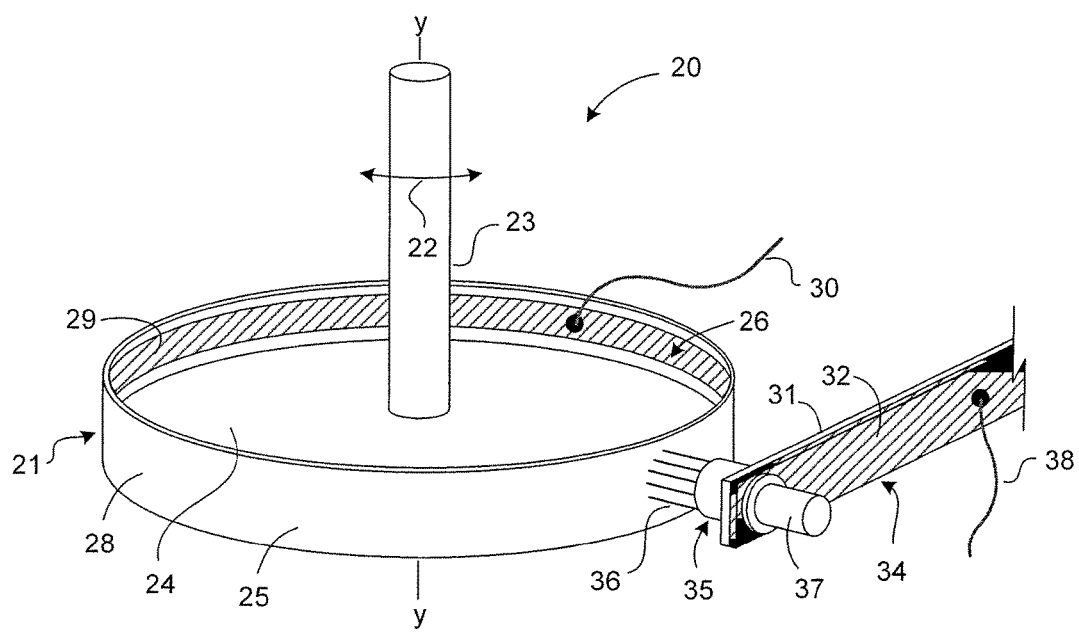
Fig. 3. Static apparatus with small oscillation capability for making FOT static contact resistance measurements with brush and ring submerged in liquid nitrogen.

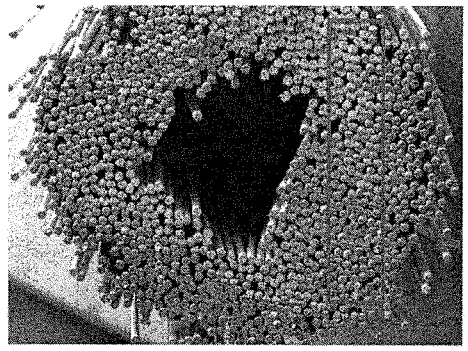
Fig. 4A
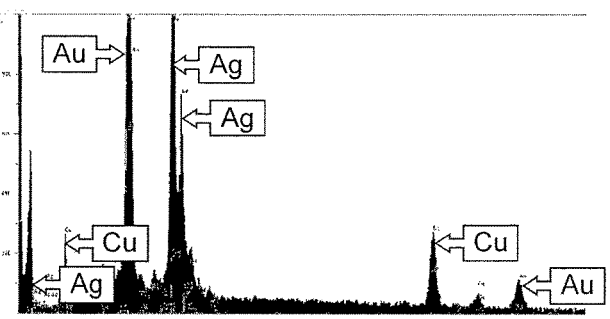
Fig. 4B
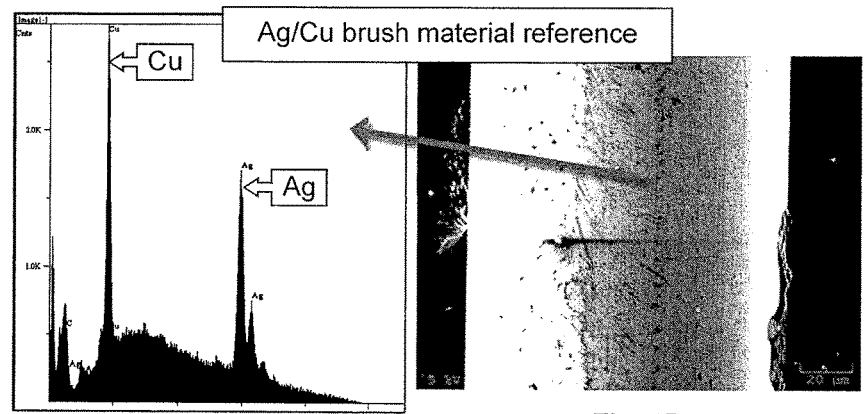
Fig. 4C
Fig. 4D
Fig. 4. SEM/EDAX analysis of an Ag/Cu high-compliance FOT brush that has been rotated at 30 RPM on a superconducting slip-ring with an electrodeposited rotor ring while submerged in liquid nitrogen. The Au shown in the analysis confirms Au that has been transferred from the slip-ring to the tips of each of the fibers.

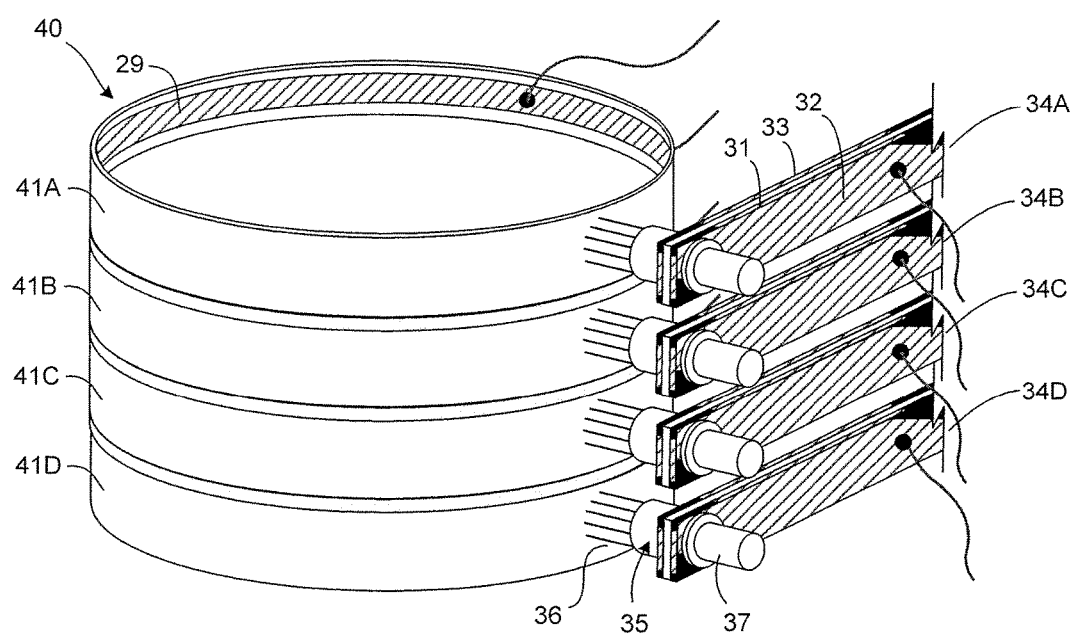
Fig. 5. Multi-channel drum-type superconducting slip-ring.

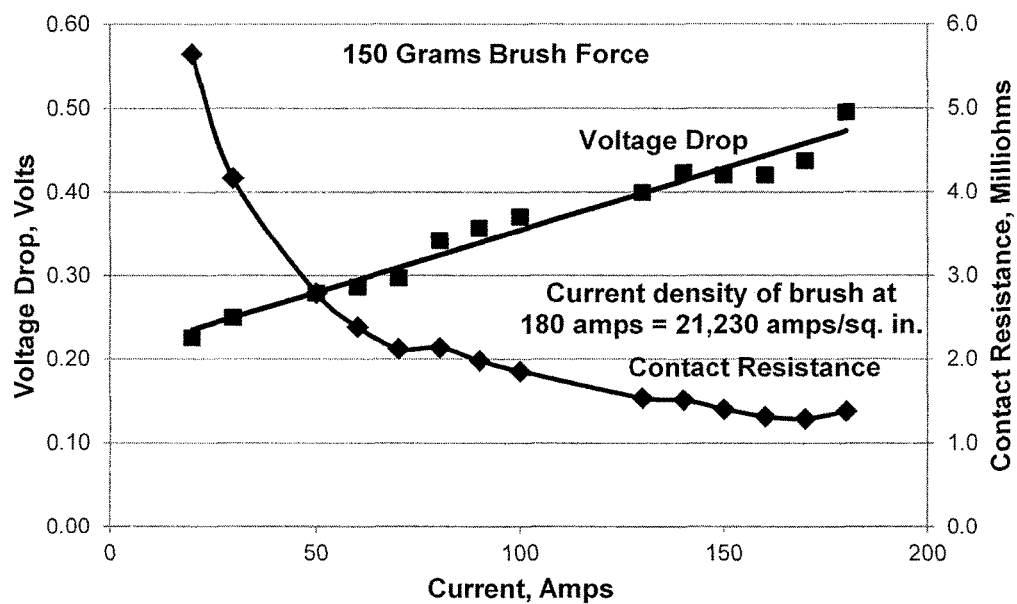
Fig. 6. Voltage drop and contact resistance in liquid nitrogen with high-compliance FOT brushes at 30 RPM and 0-180 amps.

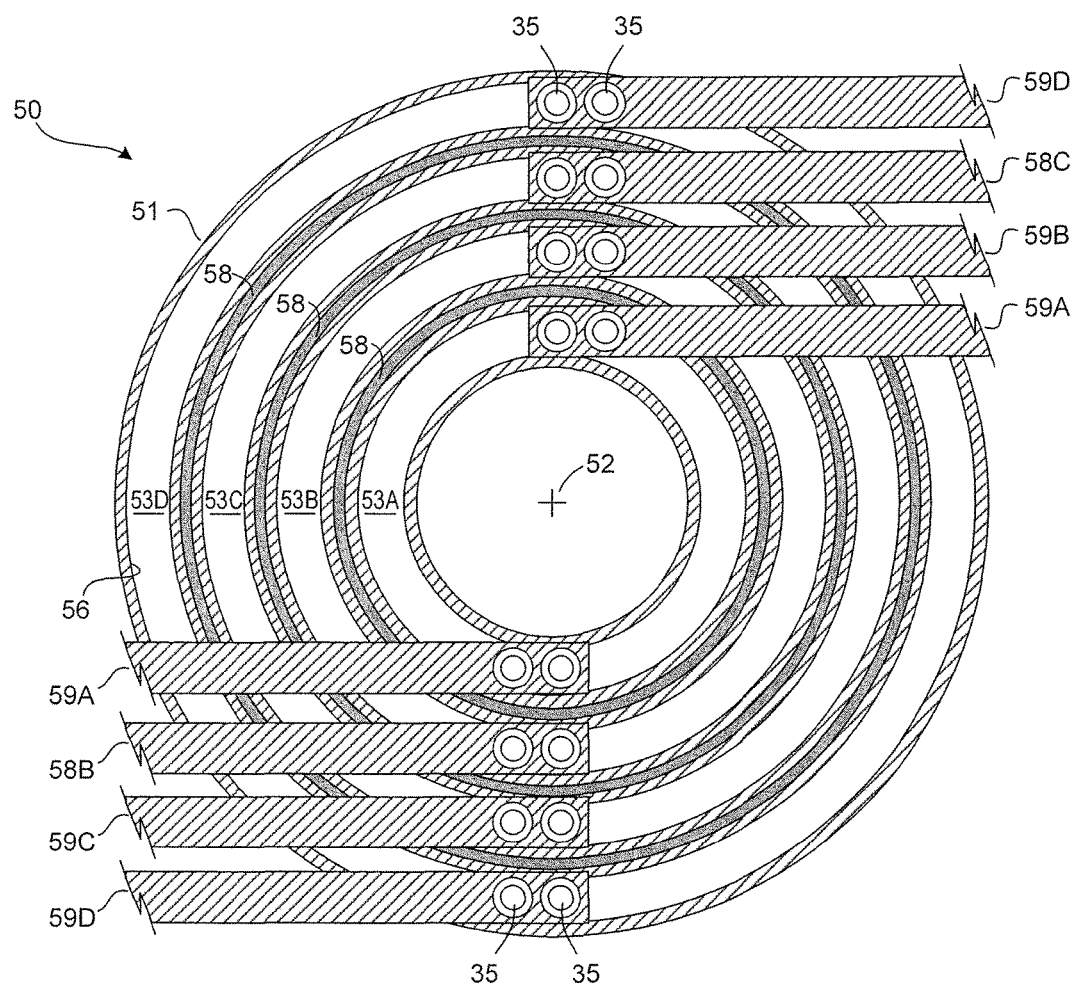
Fig. 7. Pancake slip-ring with superconducting ribbons on brushes and rings.

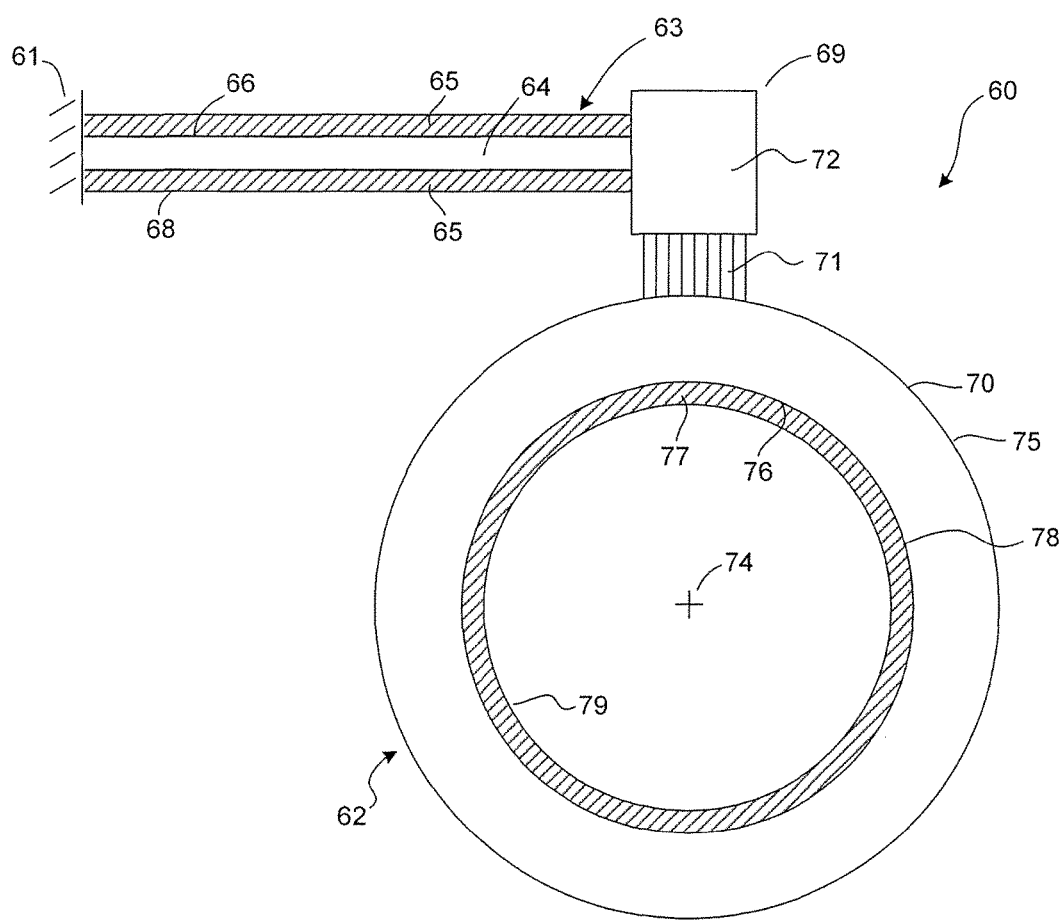
Fig. 8. Slip-ring with superconducting ribbons attached to a cantilever brush spring and inside diameter of the rotor.

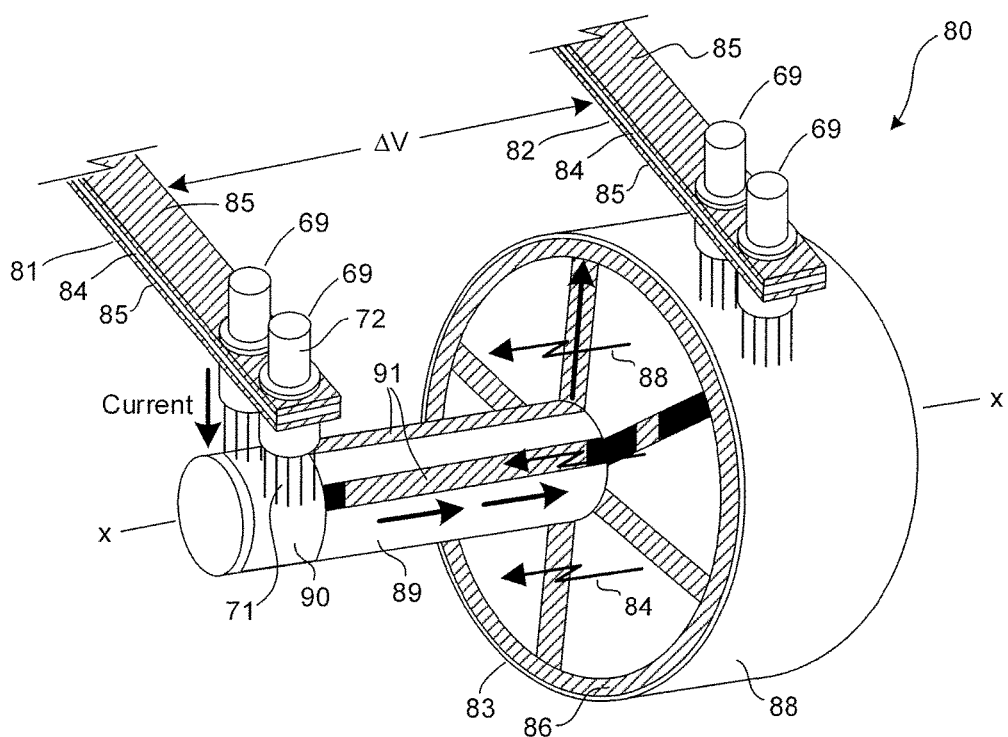
Fig. 9. A disk-armature homopolar motor adapted with FOT brushes and superconducting cantilever springs.

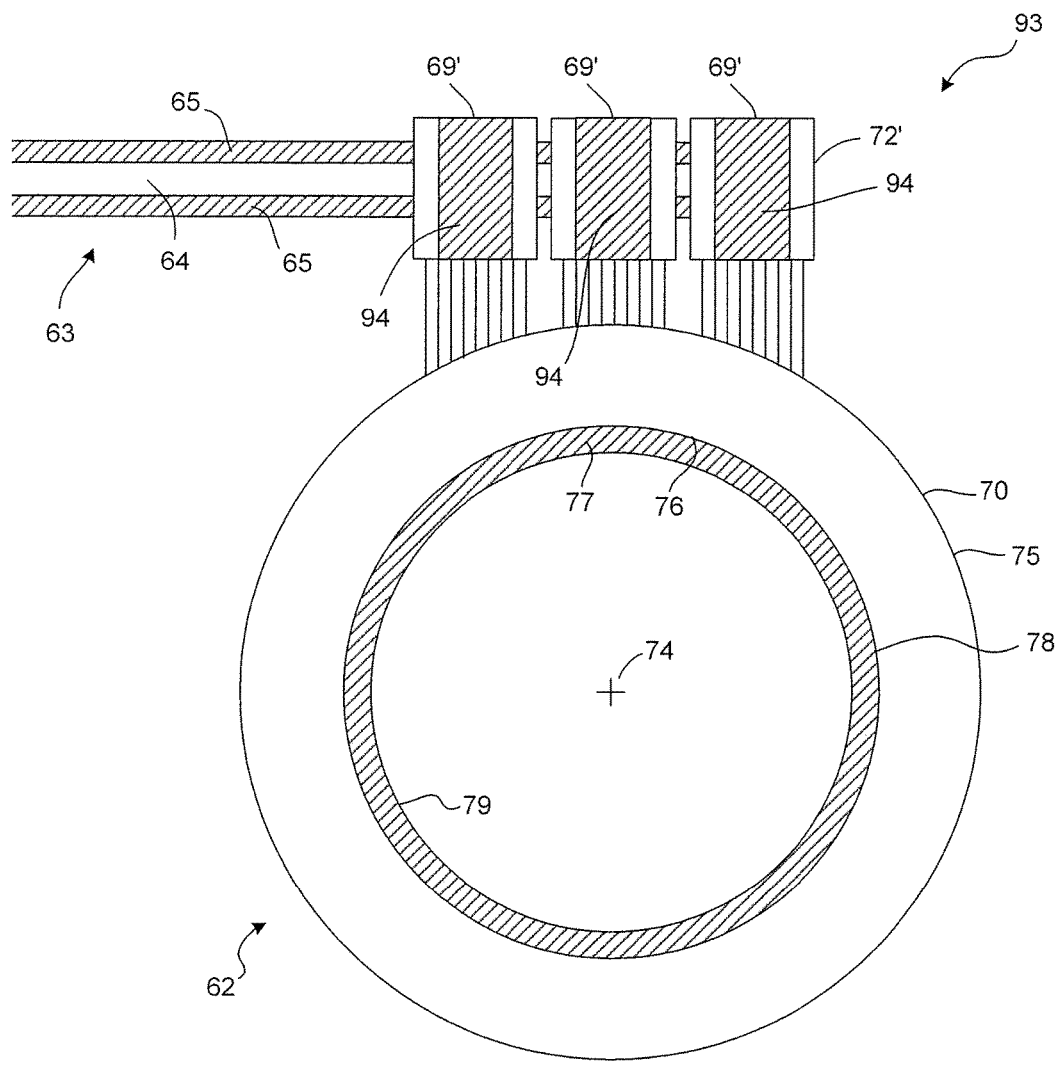
Fig. 10. Superconducting slip-ring with cantilever brush springs and additional FOT brush assemblies for additional current capacity.

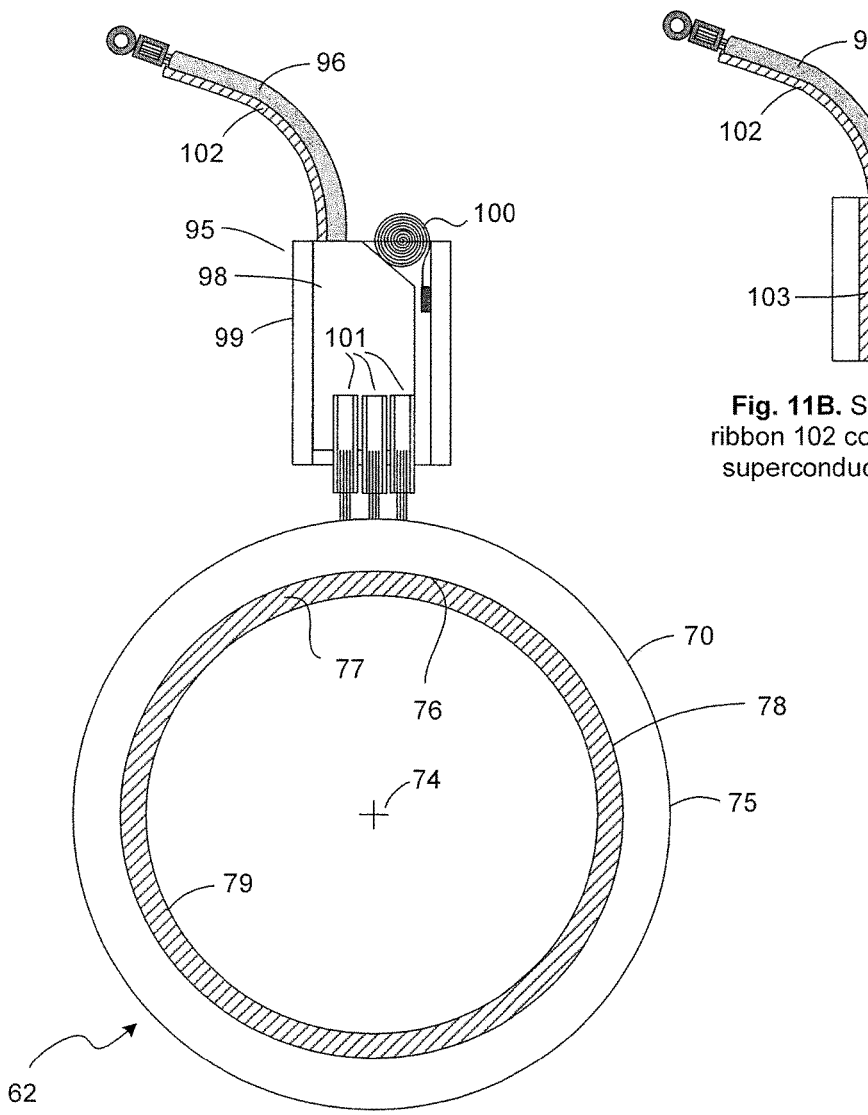
Fig. 11B. Superconducting ribbon 102 communicates with superconducting ribbon 103.
Fig. 11A. Superconducting slip-ring with negator spring and FOT brush assembly.

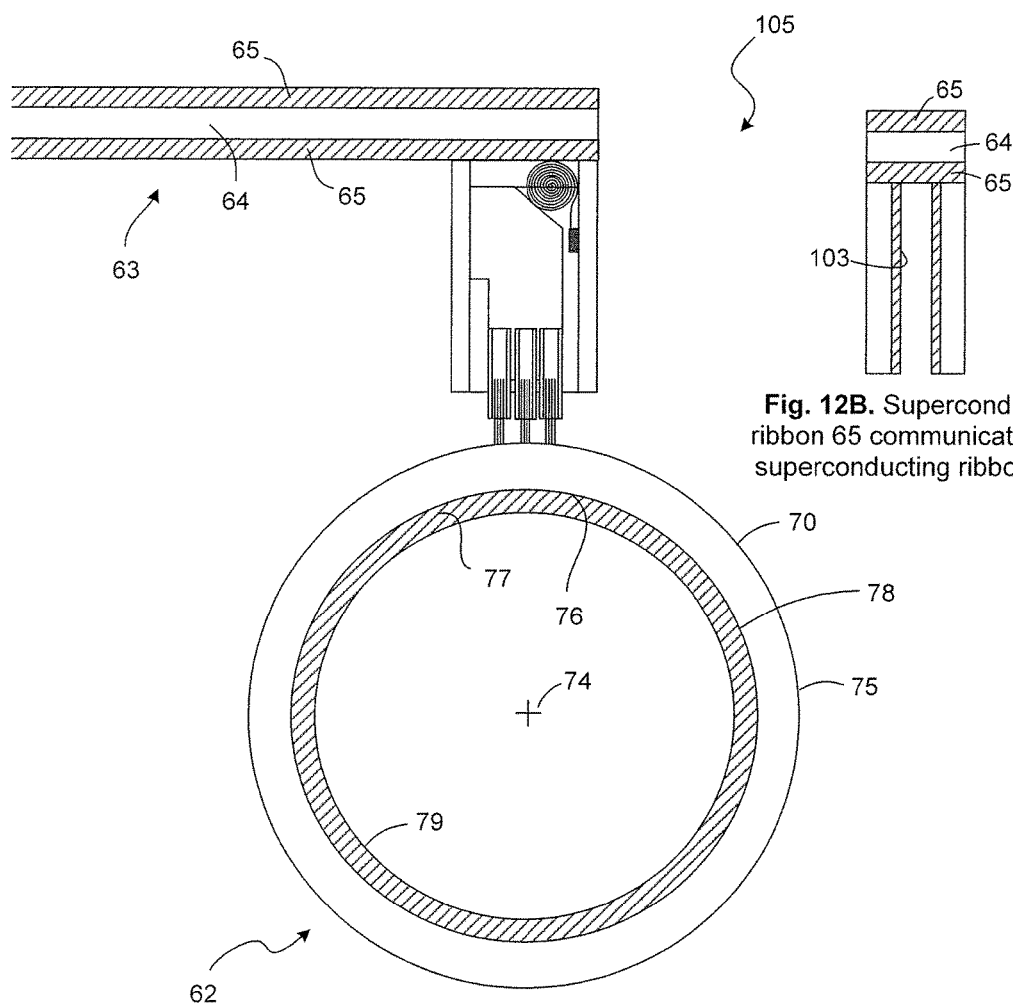
Fig. 12B. Superconducting ribbon 65 communicates with superconducting ribbon 103.
Fig. 12A. Technique for connecting cantilever spring to metal brush holder. Cantilever spring with ribbons replaces the braided lead and shunt. Superconducting ribbons on both sides of cantilever spring bring current to brush holder.

SUPERCONDUCTING DEVICES, SUCH AS SLIP-RINGS AND HOMOPOLAR MOTORS/GENERATORS

TECHNICAL FIELD

The present invention relates generally to electrical contacts for use with slip-rings, homopolar motors/generators, etc. that are used to transmit electrical power and/or signals between two members (e.g., a rotor and a stator), and, more particularly, to improved devices utilizing fiber-on-tips ("FOT") brush technology and having ribbons of superconducting material(s) that have reduced electrical resistivity(ies) when cooled below their transition temperature(s) and that may transmit greatly-increased levels of electrical current between the members when so cooled.

BACKGROUND ART

Electrical contacts are used to transfer electrical power and/or signal(s) between a rotor and a stator. These devices are used in many different military and commercial applications, such as solar array drive mechanisms, aircraft and missile guidance platforms, wind energy systems, computed tomography ("CT scan") systems, and the like. In some applications, slip-rings are used in conjunction with other components, such as torque motors, resolvers and encoders. Electrical slip-rings must be designed to be located on the platform axis of rotation, or be designed with an open bore which locates the electrical contacts off-axis. Hence, the designations "on-axis" and "off-axis" slip-rings, respectively.

The diameters of slip-rings range from a fraction of an inch to multiple feet, and the relative angular speed ($\omega$) between the rotor and stator may vary from as little as one revolution per day to as much as 20,000 revolutions per minute ("rpm"). In these various applications, the electrical contacts between the rotor and stator should: (1) be able to transfer power and/or signal(s) without interruption at high relative surface speeds, (2) have long wear life, (3) have low electrical noise, and (4) be of a physical size that allows multiple circuits to be packaged in a minimum volume.

Proper management of the electrical and mechanical contact physics between the stator-mounted brush assembly and the rotor allows demanding requirements to be met. For example, if the application is an off-axis slip-ring that allows an x-ray tube in a CT scan gantry to rotate about the patient's body, the electrical contacts must be designed to carry about 100-200 amps (with possible surges of hundreds of amps), to operate at surface speeds on the order of 15 meters per second ("m/sec"), to last for 100 million revolutions, and to occupy a minimal volume within the gantry. In order to meet the 100 million revolution requirement for a device that is about six feet [1.8288 meters ("m")] in diameter, the brush force (i.e., the force with which the brush tips are urged against the rotor) must be low to minimize frictional heating and yet maintain a large number of contact points between the brush and rotor ring to achieve the required current density.

Various arrangements and configurations of prior art slip-rings employing FOT brush assemblies are representatively shown and described in U.S. Pat. Nos. 7,105,983 B2, 7,339,302 B2, 7,423,359 B2, 7,495,366 B2, 7,545,073 B2, and in US 2014/0045348 A1 (PCT/US2012/00137, filed Mar. 13, 2012). These prior art references are assigned to the assignee of the present application, and are hereby incorporated by reference.

There has been a renewed interest in the use of fibrous metal brushes in recent years. Metal fiber brushes have the capability of handling higher current densities, of having lower electrical noise, and of having longer life while operating at higher surface speeds. Each of these parameters is related to more points of contact between brush and rotor ring than with prior art composite-material brushes, to less force per fiber, and to less frictional heating. The actual area of contact between the fiber tips and a rotor ring is known as the "interfacial" area of contact. It is known that the actual area of contact between the face of a composite brush and a rotor is much less than the outline of its projected geometric area. Hence, the reason for sub-dividing brushes into elements which, in some cases, are individual small-diameter fibers. For example, FOT contacts are capable of carrying current densities on the order of 2000-3000 amps/sq.-in. for typical military and industrial applications, whereas composite-material brushes are limited to carrying current densities of about 200-600 amps/sq.-in. for these applications. FOT brushes can be designed to meet higher current densities by increasing the diameter of the bundle, and, thus, the number of fibers in the bundle.

Also, it has been shown that brush bundles designed with the centermost fibers removed, will generate less frictional heat. Table 1, below, contains data from Table 2 in US 2014/0045348 A1, supra, and further shows the improvement of the improved FOT brushes (i.e., with the centermost fibers removed) over the prior art FOT brushes (i.e., without the centermost fibers removed). This table shows that the improved FOT brush generates less frictional heating than the prior art brush by a factor of 82 to 86 times. When frictional and electrical tests are combined, the factor decreases in proportion to the square of the current. The improvement factors of 22× and 6.1× can be further improved by increasing the number of fibers in the bundle. In addition to this, the number of brushes can be designed to meet high current requirements.

TABLE 1

Frictional and Electrical Test Results

| | Improved FOT Brush Small Rotor | Prior Art FOT Brush Large Rotor | Improvement Factor |
|---|---|---|---|
| Frictional Heating | | | |
| Current (amps) | 0 | 0 | |
| Surface Speed (m/s) | 8 | 8 | |
| ΔT (° C.) | 32.9 − 30.8 = 2.1 | 28.3 − 22.4 = 5.9 | |
| Frictional Heating (cal.) | 2.1° C. × 3.3 cal/° C. = 6.93 | 5.9° C. × 101 cal/° C. = 596 | 596/6.93 = 86.0× |
| Current (amps) | 0 | 0 | |
| Surface Speed (m/s) | 14 | 14 | |
| ΔT (° C.) | 34.2 − 30.8 = 3.4 | 31.5 − 22.4 = 9.1 | |
| Frictional Heating (cal.) | 3.4° C. × 3.3 cal/° C. = 11.22 | 9.1° C. × 101 cal/° C. = 919 | 919/11.22 = 81.9× |
| Frictional and Electrical Heating | | | |
| Current (amps) | 10 | 10 | |
| Surface Speed (m/s) | 8 | 8 | |
| ΔT (° C.) | 35.4 − 32.9 = 2.5 | 30.1 − 28.3 = 1.8 | |
| Electrical Heating (cal.) | 2.5° C. × 3.3 cal/° C. = 8.25 | 1.8° C. × 101 cal/° C. = 181.8 | 181.8/8.25 = 22× |
| Current (amps) | 20 | 20 | |
| Surface Speed (m/s) | 14 | 14 | |

TABLE 1-continued

Frictional and Electrical Test Results

|  | Improved FOT Brush Small Rotor | Prior Art FOT Brush Large Rotor | Improvement Factor |
|---|---|---|---|
| ΔT (° C.) | 44.3 − 34.2 = 10.1 | 33.5 − 31.5 = 2 |  |
| Electrical | 10.1° C. × 3.3 | 2° C. × 101 | 202/33.33 = |
| Heating (cal.) | cal/° C. = 33.33 | cal/° C. = 202 | 6.1× |

An article (Lewis, Norris E., Reed, Charles W., Witherspoon, Barry K.; "Lubrication Quantity: Observation of the Effects on Gold Sliding Contact Wear Character and In Situ Contamination Formation"; *IEEE Transactions on Components, Hybrids, and Manufacturing Technology*, Vol. CHMT-2, No. 1., March 1979.), reports:

"It has been observed that for certain slip-ring assemblies the wear character is altered by varying lubricant quantity. These observations were made on gold alloy sliding contacts tested under closely controlled laboratory conditions and on similar contacts taken from field installations. For thin-film boundary lubrication, the wear process follows the adhesive and abrasive modes set forth by Antler. However, for the flooded boundary lubrication, the wear process appears to stay in the adhesive mode as long as the flooded condition exists.

The observations that have been made are as follows:

1) Independent of the lubricant used, sliding gold contacts lubricated with thin films generated finely-divided black appearing wear particles . . . .

2) Independent of the lubricant used, sliding contacts flooded with lubricant to the extent that the brush and ring contact zone are submerged generate much larger wear particles, which are gold in appearance, than the thin-film lubricated contacts . . . .

3) Sliding contacts that have been flooded with lubricant are less prone to form contaminant films in the contact zone that result in electrical noise than those lubricated with thin films. This is particularly true when the contact assemblies are exposed to multichemical environments."

When lubricant levels are increased such that the contact interface is submerged, the wear mode changes from abrasive to adhesive. Studies have shown that when adhesive wear occurs, rotor material will transfer from the rotor (ring) to the stator (brush). As sliding continues, the ring material becomes work-hardened, and the life of the contacts is increased. When silver/copper ("Ag/Cu") FOT brushes are run on an electrodeposited gold rotor ring while submerged in liquid nitrogen, gold from the rotor ring transfers to the fiber tips and, thus, gives a more-noble gold-on-gold contact interface. (See SEM/EDAX results in FIGS. 1A-1D, and FIGS. 4A-4D.)

In addition to this, there is a significant cost reduction by using silver/copper alloy fibers with transferred gold tips versus gold alloy fibers. As shown in Table 2, below, and using the pancake-type slip-ring illustrated in FIG. 7, which has sixteen brushes, as a cost-comparison example for gold alloy fibers vs. silver/copper fibers with transferred gold tips, the difference is $2,521.60 (i.e., $2,560.00-$38.40=$2,521.60) for sixteen brushes, based on 4000 fibers/brush.

TABLE 2

Cost Comparison for Gold Alloy Fibers vs. Silver/Copper (Ag/Cu) Alloy with a Transferred Gold Tip for the Pancake-Type Slip-Ring with Sixteen Brushes Shown in FIG. 7

|  | Gold Alloy | | Ag/Cu with Gold Tip | |
|---|---|---|---|---|
| Number of Fibers/Brush | Cost per Brush | Cost for 16 Brushes | Cost per Brush | Cost for 16 Brushes |
| 1200 | $ 48.00 | $ 768.00 | $0.72 | $11.52 |
| 2000 | $ 80.00 | $1,280.00 | $1.20 | $19.20 |
| 4000 | $160.00 | $2,560.00 | $2.40 | $38.40 |

Another article, [Reichner, P. and Doshi, V. B.; "A Homopolar Motor for the Demonstration of New High Current Brushes"; *Advances in Electrical Current Collection*: Ed. I. R. McNab. New York: Elsevier/North-Holland Inc.; (1982), at pp. 69-71], reports:

"Under proper conditions, extremely high currents can be transferred across sliding electrical contacts. This has been demonstrated in recent research experiments with solid and fiber brushes as well as with liquid metal current collection systems. The ultimate objective of this research is the development of practical electrical machines of high power density and high efficiency. Liquid metal current transfer systems have the advantage of essentially 100% area coverage of the slip-ring but they introduce problems of liquid containment, particularly for motors where inertial confinement techniques cannot be applied throughout the full operating speed range. Commonly used liquid metals also have problems of chemical stability and compatibility, more stringent insulation requirements and even safety hazards. The recent experimental results with solid and fiber brushes promise efficient collector operation with good brush life.

In low voltage high current machines such as the homopolar (or unipolar) motor or generator, the current collector at conventional current densities is a major factor in machine size, weight and power loss. This is seen in the relative size of the spirally grooved collectors and the active length in the early machine . . . . Here, the active length is less than 10% of the rotor length.

Translation of experimental high current brush concepts into practical machine applications requires consideration of and control of a number of factors, primarily those associated with temperature and atmosphere. For example, three potential effects of increased slip-ring coverage are as follows:

(1) There is a concentration of power dissipation, which will result in excessive temperatures unless adequate cooling techniques are employed.

(2) The reduced access time of the track surface to the surrounding atmosphere may influence the effectiveness of lubricating films in the form of adsorbed or chemisorbed surface layers and could result in higher friction and wear.

(3) The increased concentration of wear debris, with reduced area for removal, could interfere with the intimacy of brush contact and possibly with the freedom of brush motion.

In addition, when the brush current density is greatly increased, the sectional area of the shunt lead wire, between the brush and the stator conductor, must increase. The shunt length may also be increased to maintain flexibility. The shunt and brush holder become major factors in the current collection system design. Inertial effects must also be considered in some applications, such as vehicular drives."

As summarized in Table 3, below, the electrical contact problems for slip-rings and homopolar motors listed above can be eliminated by the application of superconducting ribbons and FOT brushes submerged in liquid nitrogen.

TABLE 3

| | Solution | |
|---|---|---|
| Problem | Liquid Nitrogen | Superconducting Ribbons |
| Power Dissipation | ✓ | ✓ |
| Effectiveness of Lubricating Films | ✓ | |
| Wear Debris | ✓ | |
| Sectional Area of the Shunt Lead Wire | ✓ | ✓ |
| High Machine Power Density | ✓ | ✓ |

Efforts have been directed toward developing a superconducting homopolar motor. This would be particularly advantageous in shipboard propulsion systems. One source [Patel, Makund R.; *Shipboard Propulsion, Power Electronics, and Ocean Energy*; CRC Press, Boca Raton, Fla. (2012) (at pp. 219-220)] has recognized the possibility of weight and volume reductions by using a homopolar motor over a conventional copper motor. For example, a 21-megawatt 4-kilovolt copper motor having a shaft rotating at 150 rpm would weigh about 183 tonnes (i.e., 1 metric tonne=1000 kilograms or 2204.6 pounds), whereas a 36.5-megawatt 6.6-kilovolt high-temperature superconducting motor having a shaft rotating at about 120 rpm would weigh less than 75 tonnes. No commutator is needed in the homopolar machine. Because the homopolar motor uses only DC current, it permits the motor drive to be less complex and less expensive than other motor drives. However, high-power homopolar motors with tens of megawatt ratings must carry enormous currents. This poses design challenges in current collection, brush erosion and sparking. While a superconducting homopolar motor can be more power-dense, run quieter, and be more energy efficient than a permanent magnet motor, this article states that the successful collection of large currents needed for homopolar motors with tens of megawatts remains to be demonstrated. [Accord, Superczynski, Jr., Michael J.; "Homopolar Motor with High Temperature Superconductor Field Windings"; *IEEE Transactions on Applied Superconductivity*, Vol. 7, No. 2 (June 1997).]

Another source [Kalsi, Swann Singh; "Applications of High Temperature Superconductors to Electric Power Equipment"; IEEE, John Wiley & Sons, Inc., Hoboken, N.J. (2011) (at p. 135)] reviewed the development of superconducting homopolar motors, and concluded that brushes are the biggest challenge to the development of DC homopolar machines. This article recites that solid carbon and metal-graphite brushes have been found inadequate due to their low current density capability and excessive wear. Liquid metal brushes were reportedly also tried, but were deemed to be unsuitable due to material and life limitations. This article reports that copper fiber brushes operating in a wet humidified carbon dioxide ("$CO_2$") environment are being considered, and appear to provide a compromise between current-carrying capability and long-term wear:

"Brushes are the biggest challenge for DC homopolar machines. The brushes are located in the stationary part of the motor (stator) and provide the electrical connection to the normally conducting, liquid-cooled rotor. Solid carbon or metal-graphite brushes were found inadequate due to their low current density capability and excessive wear. Graphite fiber brushes were used with some success in early superconducting homopolar motors. Liquid metal brushes were also developed and applied to homopolar machines through the 1980s, but were not suitable for many applications due to material and life limitations. Currently copper fiber brushes operating in a wet humidified $CO_2$ environment are being considered, and this provides a compromise between current-carrying capability and long-term wear. Such brushes are expected to provide a five-year operational life. For a typical operating profile this equates to motor slip-ring travel of $6.5 \times 10^7$ m/yr. A significant challenge is to control the brush losses in order to limit their maximum operating temperature. For this reason[,] complex means for brush loading and liquid cooling of the rotor and stator are necessary."

Table 4, below, contains wear data taken from Table 3 of US 2014/0045348 A1, supra, compiled for improved FOT brushes (i.e., with the centermost fibers removed) which were tested successfully for $4.22 \times 10^9$ and $5.5 \times 10^9$ inches of ring travel with cantilever and negator springs, respectively. It was concluded that, based on the condition of the brushes, the test results could be projected for another 5-10 billion inches of ring travel. These tests were conducted at ambient temperature with a very thin film of lubricant. It would be expected that an equal or better life would be achieved when running submerged in liquid nitrogen. The free length of the brushes was 0.4 inches at the beginning of test. Based on the results of this test, the requirement of $6.5 \times 10^7$ m/yr. ($2.56 \times 10^9$ inches/yr.), referenced above, should be exceeded by a factor of two.

TABLE 4

Small Diameter Rotor Wear Study

| | Cantilever Spring | Negator Spring |
|---|---|---|
| Total inches of travel | $4.22 \times 10^9$ | $5.5 \times 10^9$ |
| Total wear (inches) | 0.025 | 0.010 |
| Dimensionless wear rate (inches/inch) | $5.92 \times 10^{-12}$ | $1.82 \times 10^{-12}$ |

The advantages of improved FOT brushes (i.e., with the centermost fibers re-moved) are summarized in Table 5.

TABLE 5

Advantages of Improved FOT Brushes

| | |
|---|---|
| 1 | Number of fibers in the bundle can be varied to meet the power requirements. |
| 2 | Center can be removed from the brush to give higher compliance, less frictional heating, and longer wear life. (See Table 4.) |
| 3 | Collimator can be adjusted to vary free length of fibers to facilitate long wear life. |
| 4 | FOT brush and tube can be designed with an adjustable collimator that will limit brush fiber distortion in response to B-field. |
| 5 | FOT brush cross-section is circular and, therefore, B-field forces are the same from all directions and, thus, is superior to a high-aspect brush. |
| 6 | Transfer of gold ("Au") from the ring to silver/copper ("Ag/Cu") fibers gives a more-noble contact interface and a lower contact resistance, which reduces the consumption of liquid nitrogen. (See FIGS. 1A-1D and FIGS. 4A-4D.) |
| 7 | As transfer continues, the contact interface work-hardens, and, thus, gives a longer contact life. |

TABLE 5-continued

Advantages of Improved FOT Brushes

| | |
|---|---|
| 8 | Superconducting ribbons located on both sides of the brush-springs stabilize the deflection of the spring when cooled to liquid nitrogen temperature. |
| 9 | A slip-ring typical of that shown in FIG. 5 demonstrated the ability to carry 21,230 amps/sq.-in. current density with an improved FOT brush (1200 fibers) at liquid nitrogen temperature. (See FIG. 6.) |
| 10 | Anode Effect When DC power is being transmitted by a sliding contact, the positive brush can wear as much as 10 times more than the negative and neutral brushes. The dielectric strength of liquid nitrogen is higher than the dielectric strength of air by a factor of about 20, and, thus, should reduce the difference in wear rate between anode and cathode |

In many cases, superconductors like those referenced above, and also in Table 6, below, have been used. [Source: Sheahen, Thomas P.; *Introduction to High-Temperature Superconductivity*; Plenum Press, New York; (1994), Chapter 1, p. 4]:

"There are several ceramics, based on copper oxide, which remain superconducting near 100 K. For example, the compound yttrium barium copper oxide (YBCO) has been found to be superconducting up to 92 K. This may not seem like a 'high' temperature to most people, but to the engineers figuring the cost of refrigerants, it is high enough: liquid nitrogen is sufficient to cool YBCO into its superconducting range."

Superconductivity is a phenomenon exhibited by certain materials when cool-ed below their respective transition temperatures. Below these transition temperatures, the superconducting materials exhibit substantially-zero electrical resistance. Early efforts in this regard were limited by the temperatures needed to cause various materials to transition to superconducting status. For example, helium becomes liquid at about 4.2° K, neon becomes liquid at about 28° K, nitrogen becomes liquid at about 77° K, and oxygen becomes liquid at about 90° K. However, oxygen is combustible. It is easier and much less costly to liquefy nitrogen, than it is to liquefy helium and neon. At the same time, newer materials have been developed that have higher transition temperatures below which they become superconducting. These are known as high-temperature superconducting ("HTSC") materials. Examples of such HTSC materials are set forth in Table 6.

TABLE 6

HTSC Materials

| Name | Formula | Transition Temperature (° K) |
|---|---|---|
| Yttrium barium copper oxide | $Y_1Ba_2Cu_3O_7$ | 92 |
| Bismuth strontium calcium copper oxide (2223 phase) | $(Bi, Pb)_2Sr_2Ca_2Cu_3O_x$ | 105 |
| Thallium barium calcium, copper oxide (1223 phase) | $Tl_1Ba_2Ca_2Cu_3O_y$ | 115 |
| Mercury barium calcium copper oxide (1223 phase) | $Hg_1Ba_2Ca_2Cu_3O_y$ | 135 |

Accordingly, it would be highly desirable to provide improved electrical contacts for transmitting electrical power and/or signal(s) between a rotor and a stator.

It would also be highly desirable to provide improved fiber brush assemblies for use in slip-rings and homopolar motors and generators.

It would also be highly desirable to provide slip-rings and homopolar motors/generators that employ FOT brush technology combined with superconducting ribbons strategically located on FOT brush-springs, on the inner diameter of the rotor ring, and on the disk-armature of a homopolar motor to significantly increase the current-carrying capability of the brush-spring and ring combination, when cooled below the transition temperature(s) of the superconducting material(s). The superconducting ribbon is located on the inner diameter of the rings (slip-ring) and disk-armature (homopolar motor) so that the FOT brushes will not wear through the copper layer on the ribbon. In this case, the liquid nitrogen that reduces the brush and ring combination temperature to 77° K, will also be the lubricant for the contact interface.

These and other objects and advantages will become apparent from the foregoing and ongoing written specification, the drawings, and the appended claims.

DISCLOSURE OF THE INVENTION

With parenthetical reference to the corresponding parts, portions or surfaces of the disclosed embodiment(s), merely for purposes of illustration and not by way of limitation, the present invention provides an improved device adapted to provide electrical contact between a stator and a rotor.

In one aspect, the improved device (40) is adapted to provide electrical contact between a stator and two rotor rings (41A, 41B, . . . ), and broadly includes: at least two current-carrying brush-springs (34, 34) mounted on the stator, each brush-spring having two opposite surfaces; at least one fibrous brush assembly (35) mounted on each brush-spring, each brush assembly having a bundle of fibers (36) arranged such that the tips of the fibers will engage an associated rotor ring for transferring electrical current between the stator and the associated rotor ring; a ribbon (32, 33) of superconducting material mounted on opposite surfaces of each brush-spring and communicating the stator with each brush assembly mounted on the associated brush-spring; another ribbon (29) of superconducting material mounted on the inside diameters of the rotor rings; and wherein the device is submerged in a cryogenic fluid at a temperature below the transition temperatures of the superconducting materials such that the electrical resistivity of the device will be reduced to substantially-zero and the current-transferring capability of the device will be increased.

The dielectric strength of the cryogenic fluid may be about twenty times the dielectric strength of air.

The superconducting materials (29, 32, 33) may be the same.

The cryogenic fluid may be liquid nitrogen.

The ribbons mounted on each brush-spring are secured thereto, as by being soldered to the brush-spring.

The ribbons (32, 33) mounted on each brush-spring (31) may be configured and arranged such that the force exerted by each brush-spring on the associated brush assembly will not be affected by the superconducting ribbons mounted thereon when the device is cooled to the temperature of the cryogenic fluid.

The ribbons (32, 33) mounted on each brush-spring may be dimensionally the same.

Each brush assembly may include a brush tube (37), and one marginal end portion of the associated fiber bundle may be received in the brush tube.

The device may further include: a collimator tube surrounding a portion of each brush tube and extending therebeyond such that the lower end of the collimator tube is adapted to limit lateral movement of the lower marginal end portions of the fibers in the associated bundle when the rotor rotates relative to the stator.

Each collimator tube may be adjustably mounted on the associated brush tube.

A central portion of the fibers below each brush tube may be removed so that the fibers extending below each brush tube are in the form of an annulus.

The device may be a slip-ring (40), a homopolar motor (80), a homopolar generator (80), or some other type of device.

The fibers in the bundle have a nominal diameter of about 0.003 inches, and the maximum current density per fiber may be about 1769 amps/sq.-in.

In another aspect, the invention provides an improved method of providing a gold-on-gold electrical sliding contact between a rotor ring (41) and the tips of a plurality of metal fibers (36) mounted in a brush assembly (35) on a stator, comprising the steps of: providing a rotor (41); providing a gold ring on the rotor; providing a brush assembly (35) having a bundle of silver/copper fibers (36); mounting each brush assembly on the stator such that the tips of the metal fibers engage the rotor ring; submerging the brush assemblies in a cryogenic fluid; and moving the rotor relative to the fiber tips such that gold is transferred from the rotor ring to the tips of the fibers; thereby to provide a gold-on-gold electrical sliding contact between the rotor ring and the tips of the fibers.

The rotor may be part of a drum-type slip-ring (see, e.g., FIG. 5), a pancake-type slip-ring (see, e.g., FIG. 7), a disk-armature-type of homopolar motor or a disk-armature-type of homopolar generator (see, e.g., FIG. 9). The rotor ring may be provided on an outer surface of the rotor.

The method may include the additional steps of: providing a current-carrying brush-spring (31) having opposite surfaces; providing ribbons (32, 33) of superconducting material; mounting a ribbon of the superconducting material on each of the brush-spring opposite surfaces; mounting a proximate end of the brush-spring on the stator; and mounting each brush assembly (35) on a distal marginal end portion of the brush-spring such that the stator communicates with the brush assembly through the brush-spring and the ribbons.

The method may further include the additional steps of: providing another ribbon (29) of superconducting material; and mounting such other ribbon on the inside diameter of the rotor ring (41).

The cryogenic fluid is preferably at a temperature less than the transition temperature of the superconducting material, and the other superconducting material.

The step of moving the rotor ring relative to the fiber tips may include the step of rotating the rotor ring relative to the fiber tips.

The method may further include the additional step of: biasing the tips of the metal fibers against the rotor ring with a force of about 200 grams.

In another aspect, the invention provides an improved slip-ring (40) which includes: a rotor (41a, 41B, . . . ) having at least two gold rings; a stator; spring assemblies (31, 31) having proximal ends mounted on the stator and having distal ends arranged proximate an associated one of the rotor rings, each spring assembly including a superconducting material (32, 32); at least one brush assembly (35) mounted on the distal marginal end portion of each spring assembly, each brush assembly having a brush holder (37) and having a plurality of silver/copper metal fibers (36) arranged in a bundle, one marginal end portion of the bundle being arranged within the associated brush holder, the opposite end of the bundle terminating in a plurality of fiber tips engaging such associated rotor ring; wherein the slip-ring is submerged in a cryogenic fluid such that the temperature of the superconducting material is reduced below its transition temperature; and wherein the tips of the silver/copper fibers are covered with gold; whereby the slip-ring will have gold-on-gold sliding contact between the tips of the fibers and the rotor ring.

In another aspect, the invention provides an improved homopolar motor (80), which includes: a rotor (83) having at least one gold ring (88); a stator; at least one spring assembly (82), each spring assembly having its proximal end mounted on the stator and having its distal end arranged proximate an associated rotor ring, each spring assembly including a superconducting material (85); at least one brush assembly (69) mounted on a distal marginal end portion of each spring assembly, each of the brush assembly having a brush holder (72) and having a plurality of silver/copper metal fibers (71) arranged in a bundle, one marginal end portion of the bundle being arranged within the associated brush holder, the opposite end of the bundle terminating in a plurality of fiber tips engaging the associated rotor ring; wherein the homopolar motor is submerged in a cryogenic fluid such that the temperature of the superconducting material is reduced below its transition temperature; and wherein the tips of the silver/copper fibers are covered with gold; whereby the homopolar motor will have gold-on-gold sliding contact between the tips of the fibers and the rotor ring.

In still another aspect, the invention provides an improved homopolar generator (80), which includes: a rotor (83) having at least one gold ring (88); a stator; at least one spring assembly (82), each spring assembly having its proximal end mounted on the stator and having its distal end arranged proximate an associated rotor ring, each spring assembly including a superconducting material (85); at least one brush assembly (69) mounted on a distal marginal end portion of each spring assembly, each of the brush assembly having a brush holder (72) and having a plurality of silver/copper metal fibers (71) arranged in a bundle, one marginal end portion of the bundle being arranged within the associated brush holder, the opposite end of the bundle terminating in a plurality of fiber tips engaging the associated rotor ring; wherein the homopolar motor is submerged in a cryogenic fluid such that the temperature of the superconducting material is reduced below its transition temperature; and wherein the tips of the silver/copper fibers are covered with gold; whereby the homopolar generator will have gold-on-gold sliding contact between the tips of the fibers and the rotor ring.

Therefore, the general object of the invention is to provide improved superconducting devices for providing electrical contact between two relatively-movable members, such as a rotor and a stator.

Another object is to provide improved superconducting devices for use as a slip-ring, a homopolar motor, a homopolar generator, or the like.

These and other advantages will become apparent from the foregoing and ongoing written specification, the drawings and the appended claims.

BRIEF DESCRIPTION OF THE DRAWINGS

FIG. 1A is a SEM photograph looking at the tips of a prior art fiber brush.

FIG. 1B is an EDAX analysis of the tips of the fibers, taken within the indicated box in FIG. 1A, noting the presence of gold on the fiber tips, in addition to silver and copper.

FIG. 1C is an EDAX analysis of the fiber shown in FIG. 1D, confirming that the fiber is made of an Ag/Cu alloy.

FIG. 1D is an SEM photograph of an Ag/Cu fiber as a material reference.

FIG. 2 is a plot of static contact resistance vs. current for two Ag/Cu FOT brushes on a silver-plated rotor ring, and also for an Ag/Cu FOT brush on a gold-plated rotor ring.

FIG. 3 is a schematic isometric view of a test apparatus with small-amplitude rotor oscillation capability for making FOT static resistance measurements, with the brush and ring submerged in a pool (not shown) of liquid nitrogen.

FIG. 4A is a SEM photograph looking at the tips of a high-compliance Au/Cu FOT brush.

FIG. 4B is an EDAX analysis of the tips of the fibers, taken within the box indicated in FIG. 4A, noting the presence of gold on the fiber tips, in addition to silver and copper.

FIG. 4C is an EDAX analysis of the fiber shown in FIG. 4D, confirming that the fiber is made of an Ag/Cu alloy.

FIG. 4D is an SEM photograph of an Ag/Cu fiber as a material reference.

FIG. 5 is a schematic isometric view of a drum-type multi-channel superconducting slip-ring employing the principles of the present invention FIG. 6 is a plot of voltage drop vs. current and contact resistance vs. current with high-compliance FOT brushes rotating at 30 rpm when submerged in liquid nitrogen and for currents ranging from 0-180 A.

FIG. 7 is a schematic top plan view of a pancake-type multi-channel superconducting slip-ring employing the principles of the present invention.

FIG. 8 is a schematic view of an improved drum-type slip-ring with superconducting ribbons attached to a cantilever brush-spring and inside diameter of the rotor.

FIG. 9 is a schematic view of an improved disk-armature homopolar motor/generator provided with FOT brushes and superconducting cantilever springs.

FIG. 10 is a schematic view of an improved superconducting drum-type slip-ring with cantilever brush-springs and additional FOT brush assemblies for additional current capacity.

FIG. 11A is a schematic view of a superconducting drum-type slip-ring with a negator spring and an FOT brush assembly.

FIG. 11B is a detail view showing the superconducting ribbon on the lead communicating with the superconducting ribbon in the center of the metal brush holder.

FIG. 12A is a schematic view of an improved superconducting drum-type slip-ring having a negator spring and an FOT brush assembly mounted on distal end of cantilevered spring.

FIG. 12B is a detail view showing the superconducting ribbon on the lead communicating with the superconducting ribbon in the center of the metal brush holder.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Transfer of Gold from Rotor Ring to Fiber Tips in an Experimental Superconducting Sip-Ring (FIGS. 1A-1D)

Referring now to the drawings, and, more particularly to FIGS. 1A-1D thereof, these four drawing figures depict a Scanning Electron Microscope ("SEM")/Energy Dispersive X-Ray ("EDAX") analysis of a prior art brush bundle shown in FIG. 1A.

The individual fibers in the bundle are formed of a silver/copper ("Ag/Cu") alloy. The fibers were mounted on a stator, were submerged in liquid nitrogen, and were arranged such that the tips of the fibers slidably engaged an electrodeposited layer of gold on a rotor. FIG. 1A is a SEM photograph of the distal ends of the fibers in the bundle, and shows the bundle as having a circular FOT configuration (i.e., without the centermost fibers removed). FIG. 1B is an EDAX analysis of the fiber tips, taken within the indicated box in FIG. 1A. FIG. 1B indicates the presence of gold on the fiber tips, in addition to silver and copper. Since the only source of gold is the electrodeposited layer of gold on the rotor, FIG. 1B indicates that gold from the electrodeposited rotor ring has been transferred from the rotor ring to the tips of the fibers in the bundle in the experimental superconducting slip-ring.

FIG. 1C is an EDAX analysis of an intermediate portion of an Ag/Cu fiber as a material reference. FIG. 1D is an SEM photograph of the intermediate portion of the fiber shown in FIG. 1D. The presence of gold on the tips of the silver/copper fibers (FIGS. 1A-1B) confirms that gold has been transferred from the rotor ring to the tips of the fibers.

Electrical Contact Resistance v. Current (FIG. 2)

FIG. 2 is a plot of static FOT contact resistance (ordinate) vs. current (abscissa) for the stator-mounted superconducting brush-spring and rotor ring, partially shown in FIGS. 1A-1D, when submerged in a pool (not shown) of liquid nitrogen. The contact resistance is displayed in milliohms, and the current is displayed in amps. The two curves connecting the square- and diamond-shaped data points depict the values obtained for an Ag/Cu FOT brush riding on a silver-plated rotor ring. The curve connecting the triangular data points depicts the values obtained for an Ag/Cu FOT brush riding on a gold-plated rotor ring.

These curves show that the contact resistance of the Ag/Cu FOT brushes riding on the silver-plated rings decreases sharply with increasing current between 0-30 amps, and then begins to level out (i.e., to fall less sharply) between 30-70 amps. On the other hand, the contact resistance of the Ag/Cu FOT brush riding on the gold-plated rotor ring is substantially constant in the entire current range between 0-70 amps. This confirms the nobility of the Ag/Cu fibers with gold tips sliding on a gold ring.

Drum-Type Single-Channel Test Apparatus (FIG. 3)

FIG. 3 is a schematic view of a test apparatus for making the static FOT contact resistance measurements shown in FIG. 2, with the brush and ring submerged in a pool (not shown) of liquid nitrogen. This apparatus is a single-channel drum-type slip-ring that was designed to undergo small-amplitude oscillations, but not rotate.

This apparatus, generally indicated at 20, has an upwardly-facing cupshaped rotor 21 arranged to be oscillated at small amplitudes in either angular direction, as indicated by the bidirectional arrows on arcuate line 22, about the axis (y-y) of a central vertical cylindrical shaft 23. The rotor is shown as having a superconducting ribbon 29 attached to its inside diameter 26, and has a lead 30. The rotor has an annular horizontal base 24 connected to the shaft. The ring 25 has inwardly- and outwardly-facing cylindrical surfaces 26, 28, respectively, that are generated about the axis of shaft 23.

A stator-mounted current-carrying brush-spring 31 has one superconducting ribbon 32, and the assembly thus formed is generally indicated at 34. Conductor 31 is shown as being a horizontally-elongated bar-like member having a rectangular transverse cross-section. The superconducting ribbon 32 is shown as being a horizontally-elongated bar-like member also having a rectangular transverse cross-section. The ribbon 32 may be suitably secured to the facing surface of conductor 31, as by soldering or the like. The proximal marginal end portions of the ribbon-and-conductor subassembly 34 are mounted on a stator (not shown). The ribbon 32 is connected via a lead 38. A suitable voltage source (±ΔV) is applied between leads 30, 38 to cause current to flow from the source through the slip-ring and back to the source.

A fibrous brush assembly 35 is mounted on the distal marginal end portion of the ribbon-and-conductor assembly 34. The brush assembly includes a fibrous brush 36, comprising a plurality of metal fibers 36, mounted within a brush tube 37.

The entire apparatus 20 is submerged in a pool (not shown) of a suitable cryogenic liquid, such as liquid nitrogen. While the ribbon 32 has some electrical resistance at room temperature, when cooled below the transition temperature (as when submerged in liquid nitrogen), it has substantially-zero electrical resistance. Since electrical current is conveyed from the stator to the brush assembly 35 along the ribbon-and-conductor subassembly 34 through the path of least electrical resistance, the submerged ribbon-and-conductor assembly 34 can carry high electrical currents between the stator and the brush assembly along the superconducting ribbon 32 at substantially-zero electrical resistance. After passing through the radial thickness of the rotor, such transferred current may be conveyed by the superconducting ribbon 29 on the inside of the rotor ring and returned to the sources.

Transfer of Gold from Rotor Ring to Fiber Tips in a Superconducting Slip-Ring Using High-Compliance Improved FOT Brushes (FIGS. 4A-4D)

FIGS. 4A-4D depict an SEM/EDAX analysis of a superconducting slip-ring using a high-compliance brush bundle (i.e., with the centermost fibers removed).

As with the prior art brush bundle shown in FIG. 1A, the individual fibers in the high-compliance brush bundle shown in FIG. 4A are again formed of a silver/copper alloy. The brush bundle was mounted on a stator, was submerged in liquid nitrogen, and was arranged such that the tips of the fibers slidably engaged an electrodeposited layer of gold on the rotor. FIG. 4A is an SEM photograph of the distal ends of the fibers in the bundle, and shows the bundle as having an improved high-compliance FOT configuration (i.e., with the centermost fibers removed). FIG. 4B is an EDAX analysis of the fiber tips, taken within the indicated box in FIG. 4A. FIG. 4B indicates the presence of gold on the fiber tips, in addition to silver and copper. This confirms that gold from the electrodeposited rotor ring has been transferred from the rotor ring (i.e., the only source of gold) to the tips of the silver/copper fibers in the bundle.

FIG. 4C is an EDAX analysis of an intermediate portion of an Ag/Cu fiber as a material reference. FIG. 4D is an SEM photograph of an intermediate portion of the fiber. The presence of gold on the tips of the silver/copper fibers (FIGS. 4A-4B) confirms that gold has been transferred from the rotor ring to the tips of the fibers.

Drum-Type Multi-Channel Superconducting Slip-Ring (FIG. 5)

In FIG. 5, a drum-type multi-channel superconducting slip-ring, generally indicated at 40, is shown as having a plurality of vertically-stacked rings 41 separated by intermediate dielectric barriers, which have shoulders to support a ring on each side. The various rings are severally indicated at 41 and are individually identified by the letters "A", "B", "C" and "D", respectively. Thus, the uppermost ring is indicated at 41A, the next-lower ring is indicated at 41B, the third-lower device is indicated at 41C, and the lowermost ring is indicated at 41D.

There is a plurality of vertically-spaced stator-mounted laminated ribbon-conductor-ribbon subassemblies 34, one for each device. The individual subassemblies 34 are individually identified by the letters "A", "B", "C" and "D", respectively. Subassembly 34A is associated with uppermost ring 41A, next-lower subassembly 34B is associated with ring 41B, next-lower assembly 34C is associated with ring 41C, and lowermost assembly 34D is associated with lowermost ring 41D. While these subassemblies are as before described, the leads issuing therefrom are connected to alternating DC voltage sources. Thus, the uppermost lead is connected to a positive voltage source, the second lower lead is connected to a negative voltage source, the third lower lead is connected to a positive voltage source, and the fourth lower lead is connected to a negative voltage source. The vertical spacing between the adjacent ribbon-conductor-ribbon subassemblies 34 insures that each is electrically isolated from its immediate neighbor.

Thus, the drum-type multi-channel slip-ring 40 in FIG. 5 is shown with four rings 41A, 41B, 41C and 41D. The dielectric barriers are placed in the spaces between the rings to electrically isolate each of the four rings from its adjacent neighbor(s). Similarly, the various ribbon-conductor-ribbon assemblies 34 are vertically spaced from one another, and these are connected to alternating DC voltage sources.

The entire device 40 is submerged in a suitable cryogenic fluid, such as liquid nitrogen, to lower the temperature of the superconducting material(s) below their respective transition temperature(s). Thus, this device provides a drum-type multi-channel slip-ring with the electrical connection between each rotor 41A, 41B, 41C, 41D and its associated ribbon-conductor-ribbon brush-spring assembly 34A, 34B, 34C, 34D, respectively, providing a separate channel that is isolated from the others. Conductors 31 are shown as being horizontally-elongated bar-like members having rectangular transverse cross-sections. The superconducting ribbons 32, 33 are shown as being horizontally-elongated bar-like members having rectangular transverse cross-sections. The ribbons are preferably formed of the same superconducting material, and are dimensionally the same, so that the force exerted by the ribbon-and-conductor spring assembly on the rotor will not be affected by the presence of the superconducting ribbons when the device is submerged in a cryogenic fluid.

Voltage Drop and Contact Resistance Vs. Current (FIG. 6)

FIG. 6 is a plot of voltage drop (left ordinate) and contact resistance (right ordinate) vs. current (abscissa) for a device, such as shown in FIG. 5, with high-compliance FOT brushes. The voltage drop is expressed in volts, the contact resistance is expressed in milliohms, and the current is expressed in amps. The tips of the fibers were urged to engage the ring on the outer surface of the rotor ring with 150 grams of force.

The voltage drop vs. current is shown as being a straight line drawn through the square-shaped data points. This line is shown as extending between one extreme point at 0.22 volts and 20 amps, and other extreme point at 0.50 volts and 180 amps. Thus, the voltage drop rises substantially linearly with increasing current.

The contact resistance v. current is shown by the curve connecting the triangular data points. This curve is seen as falling sharply with current from 5.6 milliohms at 20 amps to about 2 milliohms at about 70 amps, and then leveling off (i.e., falling less sharply) in the range of 70-180 amps until reaching a final value of about 1.4 milliohms at 180 amps. Thus, whereas voltage drop increases substantially linearly as current increases from 20 to 180 amps, contact resistance decreases (sharply at first, and then less sharply) over the same increasing range of current.

FIG. 6 (measurements at 30 rpm) show that the FOT brush contact resistance is in the milliohm range, and decreases as the current is increased. Thus, the total cost of ownership is less than a brush with fewer points of contact and, thus, a higher contact resistance. The apparatus for making these measurements is shown in FIG. 5.

Pancake-Type Multi-Channel Superconducting Slip-Ring (FIG. 7)

FIG. 7 shows how the principles of the present invention can be implemented in a pancake-type multi-channel slip-ring.

In FIG. 7, the improved device, generally indicated at 50, is shown as including a rotor 51 adapted to be rotated about a vertical axis 52. Since FIG. 7 is a top plan view of the slip-ring, axis 52 is perpendicular to the plane of the paper, and is represented by a point marker. The rotor is a circular or annular member, when seen in top plan, and has a plurality of concentric rings. These rings are severally indicated at 53, and are individually identified by the letters "A", "B", "C" and "D", respectively, in a progression radially outwardly from axis 52. As previously noted, each ring is generated about rotor axis 52.

Annular dielectric barriers, severally indicated at 58, are positioned in the walls of the rotor between adjacent rings to electrically isolate each ring from its adjacent neighbor(s) and to prevent cross-coupling therebetween. More particularly, there is a first dielectric barrier in the wall between rings 53A, 53B, a second dielectric barrier in the wall between rings 53B, 53C, and a third dielectric barrier in the wall between rings 53C, 53D.

A plurality of cantilever-mounted spring assemblies, severally indicated at 59, and substantially as previously described, are arranged to ride on the various rings. Each of these springs is a ribbon-conductor-ribbon lamination, as described above, having their proximal marginal end portions mounted on the stator.

Brush assemblies, again severally indicated at 35, are mounted on the distal marginal end portions of the springs 59. Each brush assembly has a plurality of FOT-mounted brush fibers that are arranged to engage the surface of the associated ring. There are two cantilever-mounted springs per ring, and these are arranged proximate the 12:00 o'clock and 6:00 o'clock positions on the rotor. The springs associated with ring 53A are indicated at 59A, 59A; those associated with ring 53B are indicated at 59B, 59B; those associated with ring 53C are indicated at 59C, 59C; and those associated with ring 53D are indicated at 59D, 59D.

Like the drum-type embodiment which can have multiple brush assemblies mounted on each spring (see, e.g., FIG. 10), the pancake-type embodiment can have multiple brush assemblies mounted on the distal marginal end portions of the springs to ensure adequate and continuous electrical contact between the fiber tips and the bottom surfaces of the various rings. Also, note that annular superconducting ribbons are located on outside diameter and inside diameter of each ring.

Drum-Type Slip-Ring with Superconducting Ribbons Attached to Opposite Sides of a Cantilever-Mounted Brush-Spring and the Inside Diameter of the Rotor (FIG. 8)

FIG. 8 is a schematic view of an improved drum-type slip-ring, generally indicated at 60, which is operatively arranged to transmit electrical power and/or signal(s) between a stator 61 and a rotor 62.

A cantilever-mounted spring assembly, generally indicated at 63, has its left or proximal end mounted on the stator 61, and has its right or distal end arranged proximate the rotor. This spring assembly has a central horizontally-elongated current-carrying brush-spring 64, and has ribbons 65, 65 of superconducting material mounted on the upper and lower surfaces of the central conductor. The central conductor may be formed of a suitable material, such as beryllium copper (BeCu), and has a generally-rectangular transverse cross-section. Thus, the central conductor has horizontally-elongated planar rectangular upper and lower surfaces, 66, 68, respectively. The central conductor has two principal functions: (1) to support the superconducting ribbons which carry the electrical current between its proximal and distal ends, and (2) to act as a flexure spring between its proximal and distal ends to urge the tips of a fibrous brush assembly 69 against a gold ring 70 electrodeposited on the outer surface of the rotor. The superconducting ribbons 65, 65 are mounted on the upper and lower surfaces of the central conductor. These two ribbons are horizontally elongated, are preferably formed of the same superconducting material, and have identical rectangular transverse cross-sections. The ribbons are suitably secured to the upper and lower surfaces of the central conductor, as by soldering or the like. The principal function of superconducting ribbons 65, 65 is two-fold: (1) to provide a path of substantially-zero resistance to current flow from the stator to the brush assembly when the entire apparatus is submerged in a cryogenic fluid to lower the temperature of the material of which ribbons 65, 65 are formed below the its transition temperature, and (2) to cancel the tendency of the spring assembly to curl upwardly or downwardly (like a bimetallic strip) when the apparatus is submerged in the cryogenic fluid.

The brush assembly 69 is mounted on the distal marginal end portion of the spring assembly. This brush assembly includes a bundle 71 of metal fibrous brushes therein. The individual fibers in this bundle may be formed of a silver/copper alloy. The upper marginal end portion of this brush bundle is received and held in a brush tube 72. The lower ends of the individual fibers in this brush bundle terminate in tips that slidably engage the ring 70 on the outer surface of the rotor.

Rotor 62 is shown as being an annular member mounted for rotation about an axis 74. Since this axis comes out of the paper in FIG. 8, it is represented by a point marker. The rotor has a thin annular ring 70 of gold electrodeposited on its outer cylindrical surface 75, and has an inner cylindrical surface 76. An annular superconducting ribbon 77 is mounted on the rotor inner surface 76. More particularly, ribbon 77 has its outer cylindrical surface 78 suitably secured to the rotor inner surface 76, as by soldering, and has an inner cylindrical surface 79.

A voltage may be selectively applied between the proximal end of the spring assembly and the rotor, by suitable leads (not shown), such that current will be caused to flow from the stator to the rotor.

The entire apparatus is submerged in a suitable cryogenic fluid, such as liquid nitrogen, so as to lower the temperature of superconducting ribbons 65, 65, 77 below their respective transition temperatures so that these ribbons will have substantially-zero resistance to passage of electrical current therethrough.

Thus, when the apparatus is submerged in the cryogenic fluid, current will flow from the stator along the length of spring assembly 63 to the brush assembly 69. Since ribbons 65, 65 will be below their transition temperatures, and will have substantially-zero resistance, these ribbons will be the path of least resistance to passage of current between the stator and the brush assembly. After passing through the brush tube, current will pass downwardly along the length of the brush bundle, and will be transferred from the tips of the fibers to rotor ring 70. After passing through the rotor, current will be conveyed by ribbon 77, which is also at substantially-zero resistance, to other parts (not shown) of the rotor.

Thus, in this embodiment, superconducting ribbons 65, 65, 77 provide the path of least electrical resistance to passage of current from the stator to the rotor, when the slip-ring is submerged in cryogenic fluid below the transition temperature of the superconducting material(s).

Disk-Armature Homopolar Motor with FOT Brushes and Superconducting Cantilevered Springs (FIG. 9)

FIG. 9 is an isometric view of an improved disk-armature-type of homopolar motor or generator.

The improved motor, generally indicated at 80, has first and second cantilever-mounted spring assemblies 81, 82 mounted on a stator (not shown). Each spring assembly has a proximal end mounted on the stator, and has a distal end arranged proximate a rotor, generally indicated at 83. Each spring assembly is shown as being a horizontally-elongated sandwiched structure having a central current-carrying brush-spring 84 having upper and lower planar horizontal surfaces, with a ribbon 85 of superconducting material secured thereto, as by soldering or the like. Thus, one ribbon 85 is secured to the upper surface of the central conductor, and the other ribbon 85 is secured to its lower surface. The central conductor may be formed of beryllium copper or the like, and is shown as having a rectangular transverse cross-section. Ribbons 85, 85 are also shown as having rectangular transverse cross-sections. The purpose of a ribbon on both sides of the spring is to double the current capacity. The dimensions of these ribbons are preferably identical so as to cancel any tendency of the spring assembly to curl like a bimetallic strip when submerged in cryogenic fluid below the transitional temperature(s) of the superconducting materials of which ribbons are made. In FIG. 9, the two spring assemblies 81, 82 are shown as being substantially identical. However, they need not necessarily be so.

The spring assemblies 81, 82 in FIG. 9 differ from the spring assembly 63 in FIG. 8 in that there are two brush assemblies 69 mounted on the distal marginal end portions of each spring assembly. As previously described, each brush assembly includes a brush tube 72, and a fiber bundle 71. The fiber bundle contains a plurality of individual fibers made of a suitable silver/copper alloy. The upper marginal end portion of each fiber bundle is received and held in the associated brush tube, as described in U.S. Pat. No. 7,105,983 B2. The fibers in each bundle terminate in lowermost tips that slidably engage portions of the rotor, as described infra. The principal reason for two brush assemblies on each spring assembly is to double the current capacity.

Rotor 83 is shown as being a horizontally-elongated specially-configured member journalled for rotation about horizontal axis x-x. Axis x-x is arranged orthogonally to the axes of elongation of spring assemblies 81, 82. The rotor has a large-diameter disk with a shaft that is connected to the disk by soldering or other acceptable method, such as threads with thread lock. A plurality of circumferentially-spaced radially-extending superconducting ribbons is located on both sides of the disk. These ribbons are received in radially-extending slots provided in the disk. The thickness of the disk will be dictated by the width of the ribbon; for example, if the ribbon is ¼" wide, the disk will have to be thicker than ½" so that a ribbon can be inserted in the slots on either side of the disk. A thin annular or cylindrical ring 88 of gold is electrodeposited on the outer surface of disk 88, and is slidably engaged by the brushes of second spring assembly 82.

The rotor also has a small-diameter shaft 89 that is a coupled to the large-diameter portion disk, and extends leftwardly and axially therefrom. A thin-walled annular ring 90 of gold is electrodeposited on the left marginal end portion of small-diameter shaft 89, and is slidably engaged by the tips of the brushes in the first spring assembly 81. A plurality of circumferentially-spaced longitudinally-extending ribbons of superconducting material, severally indicated at 91, connect the inner ends of the several spokes with ring 90.

In use, a voltage (±ΔV) is applied between the proximal ends of spring assemblies 81, 82, and a magnetic field, represented by arrows 84, 84, passes longitudinally through the rotor. The rotor rotates about axis x-x relative to the cantilever-mounted spring assemblies 81, 82, and the tips of the fibers in the respective brush assemblies slidably engage rotor rings 90, 88, respectively.

Current flows outwardly along spring assembly 81, down through the brush assemblies at the distal ends thereof, to rotor ring 90, is conveyed axially along the rotor small-diameter shaft 89 by ribbons 91 to the hub spokes, is conveyed outwardly along the spokes to the superconducting ribbon 86 of the large-diameter rotor portion, is conveyed through ring 88 to the brushes of spring assembly 82, and is conveyed through spring assembly 82 back to the stator.

The entire apparatus is submerged in a suitable cryogenic fluid, such as liquid nitrogen, to cool the apparatus down below the transition temperature(s) of the various superconducting material(s) therein. When so cooled, these various superconducting material(s) have substantially-zero electrical resistance and current takes the path of least resistance as it passes from the proximal portion of one spring assembly to the proximal portion of the other spring assembly.

The direction of current flow is a function of the polarity of the voltage (±ΔV) applied to the proximal end portions of spring assemblies 71, 72.

Superconducting Drum-Type Slip-Ring with Cantilever-Mounted Brush-Springs and Additional FOT Brush Assemblies for Additional Current Capacity (FIG. 10)

FIG. 10 is a schematic view of another embodiment of a drum-type superconducting slip-ring, generally indicated at 93.

The slip-ring shown in FIG. 10 is generally similar to that shown in FIG. 8, except that three brush assemblies, severally indicated at 69', are mounted on the distal marginal end portion of a sandwiched spring assembly 63 having superconducting ribbons 65, 65 secured to the upper and lower surfaces of a central conductor 64 to provide a ribbon-conductor-ribbon spring assembly, as previously described.

Moreover, whereas the embodiment shown in FIG. 8 had one brush assembly 69 mounted on the distal marginal end portion of spring assembly 63, in FIG. 10, there are three brush assemblies 69', 69', 69'. These brush assemblies 69' differ from those previously described in that ribbons of superconducting material, severally indicated at 94, are mounted on the outside of the brush tubes 72' so as to surround the upper marginal end portions of the brush bundles. Depending on the diameter of the brush tube, the superconducting ribbons may have to be narrow and mounted vertically so that the maximum bend radius is not exceeded. Moreover, the central cores of fibers in each brush bundle below the brush tubes have been removed such that the portion of each bundle extending downwardly below the associated brush tube is annular. This type of brush bundle, and the advantages stemming therefrom, is disclosed and claimed in US 2014/0045348 A1, which is assigned to the assignee of the present application and is incorporated by reference herein. The use of such annular brush bundles affords greatly-enhanced life to the slip-ring.

As before, the entire slip-ring shown in FIG. 10 is adapted to be submerged in a cryogenic fluid, such as liquid nitrogen, to reduce the temperatures of the various superconducting materials below their transition temperatures.

Superconducting Slip-Ring with Negator Spring and FOT Brush Assembly (FIGS. 11A-11B)

FIG. 11A is a schematic view of an improved superconducting slip-ring having a modified brush holder, generally indicated at 95, operatively associated with a rotor 62, as previously described.

In FIG. 11A, the cantilevered spring has been replaced with modified brush holder 95, which is similar to the brush holder shown in FIG. 12A of US 2014/0045348 A1. To this end, the brush holder is adapted to be mounted on the stator (not shown), and has a lead 96 communicating with a brush block 98, which, in turn, is mounted for vertical sliding movement relative to a tube 99. The brush block is biased to move downwardly by a negator spring 100, which acts between the brush block and the tube.

A plurality of fibrous brush assemblies, severally indicated at 101, is mounted on the brush block for movement therewith. Each brush assembly includes a fiber bundle. The upper marginal end portion of this bundle is received and held in the brush tube, and the lower marginal end portion of the bundle extends downwardly beneath the brush tube. Each fiber in the bundle terminates at its lowermost end in a tip the slidably engages the ring on the rotor. The principal function of the negator spring is to urge the brush holder to move downwardly with substantially constant force so as to compensate for wear.

The brush holder shown in FIG. 11A differs from that shown in US 2014/0045348 A1 in that a superconducting ribbon 102 is arranged in parallel with lead 96, and the brush block is provided with a superconducting ribbon 103 in its center. As best shown in FIG. 11B, ribbon 102 communicates with ribbon 103.

As before, the entire slip-ring is adapted to be submerged in a suitable cryogenic fluid to cool the superconducting ribbons to below their respective transition temperatures.

In FIG. 11A, the fibers in each bundle may be formed of a suitable silver/copper alloy, and the lower marginal end portion of the various bundles may be annular as taught by US 2014/0045348 A1.

Improved Slip-Ring Having Negator Spring and FOT Brush Assembly Mounted on Distal End of Cantilevered Spring (FIG. 12)

FIG. 12A is a schematic view of another form of slip-ring assembly, generally indicated at 105.

In FIG. 12A, the lead 96 shown in FIG. 11 has been eliminated. Rather, the brush holder is shown as being mounted on the distal end portion of spring assembly 63, as previously described. FIG. 12 B shows that lower ribbon 65 communicates with a superconducting ribbon 103 on the brush holder.

Here again, the entire apparatus is adapted to be submerged in a suitable cryogenic fluid to cool the various superconducting materials to below their respective transition temperatures.

Modifications

The present invention contemplates that many changes and modifications may be made.

As noted herein, the principles of the invention may be applied to either a pancake- or drum-type of slip-ring, and to a homopolar motor or generator. The brush bundles may be either compressed, as in the prior art, or annular, as taught by US 2014/0045348 A1. The tips of the fibers may be urged against the rotor ring by a cantilever-mounted spring assembly, or by a negator spring, or by some other means.

The essence of the invention is to provide improved FOT contact with a rotor ring, where certain portions of the apparatus are made of superconducting materials such that the entire apparatus may be submerged in a suitable cryogenic fluid, such as liquid nitrogen, to cool the superconducting materials below their respective transition temperatures. When this occurs, the superconducting materials will have substantially-zero electrical resistance.

Thus, the present invention involves the use of superconducting ribbons to bring current to and from a sliding contact interface. Because of their high current density capability, FOT brushes can be configured to conduct current flowing in superconducting ribbons with low contact resistance. Low contact resistance is an extremely important factor for superconducting slip-rings and homopolar motors. The lower the contact resistance the less liquid nitrogen is consumed.

The superconducting ribbons may be ½-inch wide and have a critical current $I_C$ of 307 amps. The critical current $I_C$ is the current level at which the self-field causes the superconducting state to collapse. [Source: US 2014/0045348 A1 published Feb. 13, 2014]:

"[0106] It is known that cantilever springs can be difficult to work with because of mechanical instabilities. [See, e.g., Shobert, Erle; *Carbon Brushes: The Physics and Chemistry of Sliding Contacts*; Chapter 4, FIG. 4.7, "Mechanical Considerations in Brushes and Collectors"; (1965); at p. 87.]

[0107] "Chatter can take place on cantilever-spring brushes if the spring can vibrate in a way that relieves the spring force as the brush moves in one direction, and increases it in the other. * * * This chatter can be minimized by (1) keeping the brush as short as possible; (2) so designing the spring that it is practically straight when under load; and (3) tapering the spring, as shown in FIG. 4:7b. Tapering decreases the possibility that a natural period is available for resonant vibration.

[0108] In addition, a cantilever spring has the problem that the brush force (F) decreases with brush wear (x), and ultimately the life of the brush is limited by the minimum normal force that is required to meet all electrical requirements. If there is not adequate brush force, signal brushes will not operate at acceptable electrical noise levels and power brushes may undergo electrical arcing. This is a major factor for a brush that is capable of billions of inches of ring travel. The negator spring maintains a substantially-constant force over a given displacement range throughout the life of the brush and, therefore, the life of the brush is not limited by a decreasing force with brush wear. Also, the negator spring provides an inherent dampening mechanism and, therefore, brush spring "chatter" is eliminated."

The present invention includes the attachment of superconducting ribbons to all components (i.e., both sides of the brush-springs, and the insider diameter of the ring) for a slip-ring and drum-type armature homopolar motor. Attaching superconducting ribbons to each side of the brush-spring increases the current capacity, as well as stabilizes the brush-spring movement, and thus minimizes the brush force change when going from room temperature to liquid nitrogen temperature. When negator spring designs are used as shown in FIGS. 11A-11B and FIGS. 12A-12B, tolerances must be allowed so that the brush holder and negator spring are free to move over the broad temperature range. The negator spring has the advantage of applying a constant force to the brush over a broad range of brush wear. The ribbons can be attached to both faces of a disk-armature homopolar motor. When the ribbons make the transition to the superconducting state, the electrical resistance therein drops to zero and current flows without resistance until the critical current is exceeded. It is not practical to attach ribbons to the fibers in the brush.

Recent studies have been conducted with FOT brushes and superconducting slip-rings. A drum-type slip-ring was configured with an input positive brush and ring and an output negative brush and ring (see FIG. 5). The fibers in each bundle have a nominal diameter of about 0.003 inches, and the maximum current density per fiber is about 1769 amps/sq.-in. A current density of 21,230 amps/sq.-in. was measured with a single FOT brush with twelve-hundred 0.003" diameter fibers (see FIG. 6). Additional brushes and ring pairs can be configured to carry proportional maximum current densities (see Table 7).

TABLE 7

| Number of Fibers/Brush | Current Density/Brush (amps/sq.-in.) |
|---|---|
| 1200 | 21,230 |
| 2400 | 42,460 |
| 3600 | 63,690 |
| 4800 | 84,920 |

As the numbers of fibers increases in the brush bundle, care must be taken to increase the diameter of the opening in the center of the brush as well as adjust the free length of the fibers so as to achieve the desired brush compliance.

A pancake-type slip-ring is illustrated in FIG. 7. This geometry allows a superconducting ribbon to be located on the inside diameter and outside diameter of each ring, thus, doubling the current capacity when compared to a drum-type slip-ring. An additional brush has been added to each spring, which now increases the current capacity of the brushes to compensate for the additional ribbon on each ring. The current capacity for two brushes and springs per ring will be of the order of 360 amps, and four brushes per ring on the order of 720 amps, based on the data presented in FIG. 6. Ribbons on the inside diameter and outside diameter of each ring will have a combined current capacity of 614 amps. Thus, the limiting factor for this configuration is not the brushes.

Therefore, while several forms and embodiments of the improved devices have been shown and described, and some modifications thereto have been specifically discussed, persons skilled in this art will readily appreciate that various additional changes and modifications may be made without departing from the spirit of the invention, as defined and differentiated by the following claims.

What is claimed is:

1. A device adapted to provide electrical contact between a stator and two rotor rings, comprising:
   at least two current-carrying brush-springs mounted on said stator, each brush-spring having two opposite surfaces;
   at least one fibrous brush assembly mounted on each brush-spring, each brush assembly having a bundle of fibers arranged such that the tips of said fibers will engage an associated rotor ring for transferring electrical current between said stator and said associated rotor ring;
   a ribbon of superconducting material mounted on opposite surfaces of each brush-spring and communicating said stator with each brush assembly mounted on the associated brush-spring;
   another ribbon of superconducting material mounted on the inside diameters of said rotor rings; and
   wherein said device is submerged in a cryogenic fluid at a temperature below the transition temperatures of said superconducting materials such that the electrical resistivity of said device will be reduced to substantially-zero and the current-transferring capability of said device will be increased.

2. A device as set forth in claim 1 wherein the dielectric strength of said cryogenic fluid is about twenty times the dielectric strength of air.

3. A device as set forth in claim 1 wherein said superconducting materials are the same.

4. A device as set forth in claim 1 wherein said cryogenic fluid is liquid nitrogen.

5. A device as set forth in claim 1 wherein the ribbons mounted on each brush-spring are secured thereto.

6. A device as set forth in claim 5 wherein the ribbons mounted on each brush-spring are soldered thereto.

7. A device as set forth in claim 6 wherein the ribbons mounted on each brush-spring are configured and arranged such that the force exerted by each brush-spring on the associated brush assembly will not be affected by the superconducting ribbons mounted thereon when said device is cooled to the temperature of said cryogenic fluid.

8. A device as set forth in claim 7 wherein the ribbons mounted on each brush-spring are dimensionally the same.

9. A device as set forth in claim 1 wherein each brush assembly includes a brush tube, and wherein one marginal end portion of the associated fiber bundle is received in said brush tube.

10. A device as set forth in claim 9, and further comprising:
  a collimator tube surrounding a portion of each brush tube and extending therebeyond such that the lower end of said collimator tube is adapted to limit lateral movement of the lower marginal end portions of said fibers in the associated bundle when said rotor rotates relative to said stator.

11. A device as set forth in claim 10 wherein each collimator tube is adjustably mounted on the associated brush tube.

12. A device as set forth in claim 11 wherein a central portion of said fibers below each brush tube has been removed so that the fibers extending below each brush tube are in the form of an annulus.

13. A device as set forth in claim 1 wherein said device is a slip-ring.

14. A device as set forth in claim 1 wherein said device is a homopolar motor.

15. A device as set forth in claim 1 wherein said device is a homopolar generator.

16. A device as set forth in claim 1 wherein the fibers in said bundle have a nominal diameter of about 0.003 inches, and wherein the maximum current density per fiber is about 1769 amps/sq.-in.

* * * * *